United States Patent
Jang et al.

(10) Patent No.: US 8,565,320 B2
(45) Date of Patent: Oct. 22, 2013

(54) DEVICE AND METHOD FOR ENCODING/DECODING VIDEO DATA

(75) Inventors: Euee-Seon Jang, Seoul (KR); Chung-Ku Lee, Incheon (KR); Hyun-Gyu Kim, Seoul (KR)

(73) Assignee: Humax Co., Ltd., Seongnam-Si (KR)

( * ) Notice: Subject to any disclaimer, the term of this patent is extended or adjusted under 35 U.S.C. 154(b) by 626 days.

(21) Appl. No.: 12/833,847

(22) Filed: Jul. 9, 2010

(65) Prior Publication Data

US 2010/0278273 A1 Nov. 4, 2010

Related U.S. Application Data

(63) Continuation of application No. PCT/KR2009/000039, filed on Jan. 6, 2009.

(30) Foreign Application Priority Data

Jan. 11, 2008 (KR) .................. 10-2008-0003638

(51) Int. Cl.
 *H04B 1/66* (2006.01)
(52) U.S. Cl.
 USPC ............ 375/240.25; 375/240.26; 375/240.28; 375/240.02; 382/233; 382/235; 382/239
(58) Field of Classification Search
 USPC ............ 375/240.25, 240.26, 240.28, 240.02; 382/233, 235, 239
 See application file for complete search history.

(56) References Cited

U.S. PATENT DOCUMENTS

| | | | |
|---|---|---|---|
| 6,249,320 B1 | 6/2001 | Schneidewend et al. | |
| 7,277,485 B1 * | 10/2007 | Puri et al. ................. | 375/240.08 |
| 7,657,104 B2 * | 2/2010 | Deninger et al. ............. | 382/224 |
| 2003/0147464 A1 * | 8/2003 | Amielh-Caprioglio et al. ........................ | 375/240.08 |
| 2007/0041585 A1 | 2/2007 | Ji et al. | |
| 2007/0266407 A1 | 11/2007 | Yum | |
| 2009/0305743 A1 * | 12/2009 | Gouesbet et al. ............. | 455/566 |
| 2010/0220793 A1 * | 9/2010 | Jang et al. ................. | 375/240.25 |

FOREIGN PATENT DOCUMENTS

KR 10-0684654 B1 2/2007

OTHER PUBLICATIONS

Lee et al, "Working Draft 2 of ISO/IEC 23001-4: CODEC Configuration Representation", Oct. 2006, ISO/IEC JTC1/SC29/WG11, MPEG2006/N8476, pp. 1-11.*
Lee, "Working Draft 1.0 of Reconfigurable Video Coding", Jul. 2006, ISO/IEC JTC1/SC29/WG11, MPEG2006/N8260, pp. 1-11 and 57-58.*

* cited by examiner

*Primary Examiner* — Shawn An
(74) *Attorney, Agent, or Firm* — Birch, Stewart, Kolasch & Birch, LLP

(57) ABSTRACT

Disclosed are a method of encoding/decoding video data and a device thereof. The device includes a toolbox, which stores a plurality of functional units, a reconstruction unit, which reconstructs a decoder description by receiving a compressed decoder description, a decoder description parsing unit, which converts the decoder description to an XML-based decoder description, an ADM generating unit, generates an abstract decoding model (ADM) by using the XML-based decoder description, and a decoding solution, which loads the plurality of functional units stored in the toolbox by using the ADM or the XML-based decoder description to decode input data to video data. With the present invention, it is possible to reconstruct and reassemble a decoder in various forms by using a decoder description.

14 Claims, 18 Drawing Sheets

FIG. 12

| Table Start Code | Table Code | Content | Table End Code |

FIG. 13

| FUID | VN name | Version | INPUT ports | OUTPUT ports | QID name |

FUID flag (1bit) | FUID (8bits)

VN name Length (8bits) | VN name

INPUT port length (8bits) | INPUT port name | INPUT ports flag (1bit)

OUTPUT port length (8bits) | OUTPUT port name | OUTPUT ports flag (1bit)

QID name flag (1bit) | QID name length (8bits) | QID name

FIG. 15

| Parameter name | Parent VNT index | ET index | TT index |
|---|---|---|---|

| Parameter name length (8bits) | Parameter name |
|---|---|
| Parent VNT flag (1bit) | Parent VNT index (8bits) |
| ET index flag (1bit) | ET index (8bits) |
| TT index flag (1bit) | TT index (8bits) |

FIG. 16

| Src FUIT index | Dst FUIT index | Src port name | Dst port name | Attribute name | Attribute value | ET Index |
|---|---|---|---|---|---|---|

| Src FUIT flag (1bit) | Src FUIT index (8bits) |
|---|---|

| Dst FUIT flag (1bit) | Dst FUIT index (8bits) |
|---|---|

| Src and Dst same flag (1bit) | Src port name length (8bits) | Src port name | Dst port name length (8bits) | Dst port name |
|---|---|---|---|---|

| Attribute name flag (1bit) | Attribute name length (8bits) | Attribute name |
|---|---|---|

| Attribute value flag (1bit) | Attribute value length (8bits) | Attribute value |
|---|---|---|

| ET index flag (1bit) | ET index (8bits) |
|---|---|

FIG. 17

| Kind | Literal kind | Literal value | Variable name | Operator | Child ET index | Args ET index |

Kind (3bits)

Literal kind flag (1bit) | Literal kind (3bits)

Literal value flag (1bit) | Literal value length (8bits) | Literal value

Variable name flag (1bit) | Variable name length (8bits) | Variable name

Operator flag (1bit) | Operator length (8bits) | Operator

Child ET index flag (1bit) | Child ET index (8bits) | Args ET index flag (1bit) | Args ET index (8bits)

DEVICE AND METHOD FOR ENCODING/DECODING VIDEO DATA

This application is a Continuation of PCT International Application No. PCT/KR2009/000039 filed on Jan. 6, 2009, and claims priority under 35 U.S.C. 119(a) to Patent Application No. 10-2008-0003638 filed in Republic of Korea on Jan. 11, 2008, all of which are hereby incorporated by reference into the present application.

TECHNICAL FIELD

The present invention is related to video data encoding and decoding, more specifically to a device and method for encoding and decoding video data through organic composition and selective activation of functional units.

BACKGROUND ART

Typically, a video is converted to a bitstream by an encoder. Here, the bitstream is stored depending on the coding type that satisfies the constraint condition of the encoder.

The MPEG requires syntax and semantics, which are the constraint condition of the encoder.

The syntax, which refers to the structure, format and length of data, represents the sequence of expressing the data. In other words, the syntax is to conform with a rule for encoding/decoding and defines the sequence and length of each element of the bitstream and a corresponding data format.

The semantics refers to the meaning of each bit that constitutes data. In other words, the semantics shows the meaning of each element of the bitstream.

Accordingly, the bitstream can be generated in various types depending on the encoding condition or the applied standard (or codec) of the encoder. Typically, each standard (e.g., MPEG-1, MPEG-2, MPEG-4 and MPEG-4 AVC) has a different bitstream syntax.

Accordingly, it may be considered that the bitstream encoded according to each standard or encoding condition has different types (i.e., syntax and semantics). A decoder corresponding to a pertinent encoder must be used to perform the decoding of the bitstream.

As described above, the typical bitstream decoder has a restriction that must satisfy the constraint condition of the encoder. This restriction makes it difficult to realize an integrated decoder corresponding to a plurality of standards.

DISCLOSURE

Technical Problem

Accordingly, the present invention, which is contrived to solve the aforementioned problems, provides a bitstream decoding device and a method thereof that can decode a bitstream encoded in various types (e.g., syntaxes and semantics) in accordance with each standard (e.g., MPEG-1, MPEG-2, MPEG-4 and MPEG-4 AVC) by using the same information recognizing method.

The present invention also provides a bitstream encoding method and a method thereof that can generate an extended bitstream having a decoder description added thereto or can generate a bitstream and a decoder description independently such that a bitstream encoded in various types (e.g., syntaxes and semantics) in accordance with each standard is decoded by using the same information recognizing method.

The present invention also provides a bitstream decoding device and a method thereof that can parse a bitstream, compressed in various encoding methods, by using the same information analyzing method and organically control each functional unit for performing the decoding by using the parsed data.

The present invention also provides a bitstream encoding device and a method thereof that can efficiently describe a decoder description by applying the hierarchic structure of codec to the syntax parsing and the decoding operation.

The present invention also provides a bitstream decoding device and a method thereof that can manage the scheduling of each codec and provide an organic processing structure (e.g., a parallel coupling structure, a serial combining structure, an independent processing structure and an individual processing structure) for each functional unit by using a decoder description.

The present invention also provides a bitstream encoding/decoding device and a method thereof that can commonly apply a syntax analyzing method for decoding various types of bitstreams.

The present invention also provides a bitstream encoding/decoding device and a method thereof that can apply a set of new commands for parsing various types of bitstreams by using a common syntax analyzing method.

The present invention also provides a bitstream decoding device and a method thereof that can allow a decoder to easily decode a bitstream when a syntax element is changed, added or deleted.

The present invention also provides a bitstream decoding device and a method thereof that can allow some elements used to decode a bitstream to use the element information (i.e. a result from syntax parsing) of analyzed syntax.

The present invention also provides a bitstream decoding device and a method thereof that can allow the element information of an analyzed syntax to be used to analyze the syntax element of a following bitstream.

The present invention also provides a bitstream decoding device and a method thereof that can divide functions included in various decoding operations suggested by a variety of standards (or codec) in units of functional unit to put the divided functions in a toolbox.

The present invention also provides a bitstream decoding device and a method thereof that can selectively use some functional units necessary for a toolbox in order to decode a bitstream encoded in various types.

The present invention also provides a bitstream decoding device and a method thereof that can easily change, add or delete the functional units stored in a toolbox.

In addition, the present invention is to internationally standardize the codec integration for decoding a bitstream and the generation of decoder description and the implementation of extended bitstream for processing a bitstream by using the same information analyzing method. Other problems that the present invention solves will become more apparent through the following description.

Technical Solution

To solve the above problems, an aspect of the present invention features a decoding device and/or an integrated codec device that can be universally used for various standards, and a method thereof.

In accordance with an embodiment of the present invention, a decoding device includes a toolbox, which stores a plurality of functional units, a reconstruction unit, which reconstructs a decoder description by receiving a compressed decoder description, a decoder description parsing unit, which converts the decoder description to an XML-based decoder description, an ADM generating unit, generates an abstract decoding model (ADM) by using the XML-based decoder description, and a decoding solution, which loads the plurality of functional units stored in the toolbox by using the ADM or the XML-based decoder description to decode input data to video data.

In accordance with an embodiment of the present invention, a decoding method includes (a) reconstructing a decoder description by receiving a compressed decoder description, (b) converting the decoder description to an XML-based decoder description, (c) generating an abstract decoding model (ADM) by using the XML-based decoder description and (d) loading a plurality of functional units stored in a toolbox by using the ADM or the XML-based decoder description to decode input data to video data.

In accordance with another embodiment of the present invention, a recorded medium tangibly embodies a program of instructions for performing a decoding method, in which the program of instructions is executed by a decoding device and the recorded medium is readable by the decoding device, and the method includes (a) reconstructing a decoder description by receiving a compressed decoder description, (b) converting the decoder description to an XML-based decoder description, (c) generating an abstract decoding model (ADM) by using the XML-based decoder description and (d) loading a plurality of functional units stored in a toolbox by using the ADM or the XML-based decoder description to decode input data to video data.

Advantageous Effects

As described above, an integrated codec device and a method thereof in accordance with the present invention can decode a bitstream encoded in various types (e.g., syntaxes and semantics) in accordance with each standard (e.g. MPEG-1, MPEG-2, MPEG-4 and MPEG-4 AVC) by using the same information recognizing method.

The present invention can generate an extended bitstream having a decoder description added thereto such that a bitstream encoded in various types (e.g., syntaxes and semantics) in accordance with each standard is decoded by using the same information recognizing method.

The present invention can efficiently describe a decoder description by applying the hierarchic structure of codec to the syntax parsing and the decoding operation.

The present invention can manage the scheduling of each codec and provide an organic processing structure (e.g., a parallel coupling structure, a serial combining structure, an independent processing structure and an individual processing structure) for each functional unit by using a decoder description.

The present invention can design and manufacture a variety of systems by using a described decoder description only.

The present invention can parse a bitstream, compressed in various methods, by using the same information analyzing method and organically control each functional unit for performing the decoding by using the parsed data.

The present invention can commonly apply a syntax analyzing method for decoding various types of bit streams.

The present invention can apply a set of new commands for parsing various types of bitstreams by using a common syntax analyzing method.

The present invention can easily decode a bitstream when a syntax element is changed, added or deleted.

The present invention can allow some elements used to decode a bit stream to share the element information of analyzed syntax (i.e. a result from syntax parsing).

The present invention can allow element information of analyzed syntax to be used to analyze the syntax element of a following bit stream.

The present invention can be used for the integration of a video or still image codec performing the processing in units of blocks besides MPEG-1, MPEG-2, MPEG-4 and MPEG-4 AVC codecs.

The present invention can realize each function of various decoding methods suggested by a variety of standards (or codec) in units of functional unit to put the realized functions in a toolbox.

The present invention can perform a predetermined process by selecting some functional units necessary for a toolbox in order to decode a bitstream encoded in various types.

In addition, the present invention can easily change, add or delete the functional units stored in a toolbox.

DESCRIPTION OF DRAWINGS

FIG. 12 is a diagram illustrating the structure of an FU networking table in accordance with an embodiment of the present invention.

FIG. 13 is a diagram illustrating the structure of a VNT table in accordance with an embodiment of the present invention.

FIG. 15 is a diagram illustrating the structure of a PT table in accordance with an embodiment of the present invention.

FIG. 16 is a diagram illustrating the structure of an NCT table in accordance with an embodiment of the present invention.

FIG. 17 is a diagram illustrating the structure of an ET table in accordance with an embodiment of the present invention.

MODE FOR INVENTION

Figure 1:
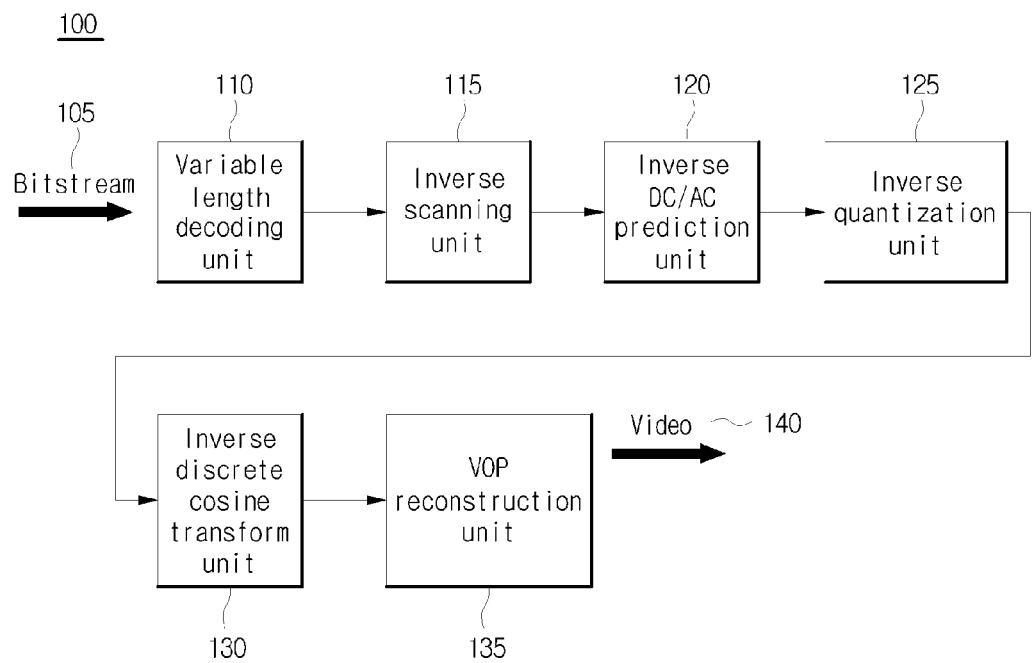
FIG. 1 is a diagram briefly illustrating the configuration of a typical decoder.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term and/or shall include the combination of a plurality of listed items or any of the plurality of listed items.

When one element is described as being "connected" or "accessed" to another element, it shall be construed as being connected or accessed to another element directly but also as possibly having yet another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of an integrated codec apparatus and a method thereof in accordance with an embodiment of the present invention will be described in detail with reference to the accompanying drawings. Identical or corresponding elements will be given the same reference numerals, regardless of the FIG. number, and any redundant description of the identical or corresponding elements will not be repeated.

Figure 2:
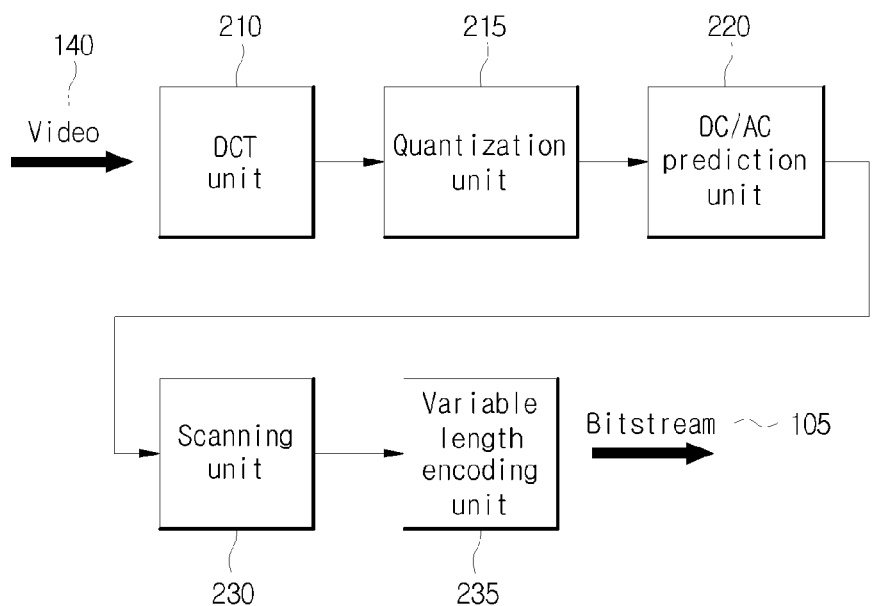
FIG. 2 is a diagram briefly illustrating the configuration of a typical encoder.

FIG. 1 is a diagram briefly illustrating the configuration of a typical decoder, and FIG. 2 is a diagram briefly illustrating the configuration of a typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135. It shall be evident that the decoder 100 has a structure that can be changed depending on an applied standard and some elements can be replaced with other elements.

If a transferred bitstream 105 is syntax-parsed and corresponding header information and encoded video data are extracted, the variable length decoding unit 110 determines a quantized discrete cosine transform (DCT) coefficient by using a prestored Huffman table and the inverse scanning unit 115 generates data having the same sequence as a corresponding video 140 by performing inverse scanning. In other words, the inverse scanning unit 115 outputs corresponding values in the inverse order of scanning in various ways. In the encoding, after the quantization is performed, a scanning direction can be determined depending on the distribution of a frequency band. Typically, the scanning method can be performed in a zigzag form. Alternatively, the scanning can be performed per codec in various ways.

Syntax parsing can be collectively performed by the variable length decoding unit 110 or by an element for processing a bitstream 105 prior to the variable length decoding unit 110. In this case, since the same standard is applied to the corresponding encoder and decoder, the syntax is parsed by a predetermined rule only, to correspond to the pertinent standard.

The inverse DC/AC prediction unit 120 determines the direction of a reference block for prediction by using the magnitude of the DCT coefficient at a frequency band.

The inverse quantization unit 125 performs the inverse quantization of inversely scanned data. In other words, the inverse quantization unit 125 returns DC and AC coefficients by using a quantization parameter (QP) designated in an encoding process.

The inverse DCT unit 130 evaluates an actual video data pixel value to generate a video object plane (VOP) by performing an inverse discrete cosine transform.

The VOP reconstruction unit 135 reconstructs a video signal by using the VOP generated by the inverse DCT unit 130 and outputs the reconstructed signal.

As illustrated in FIG. 2, an MPEG-4 encoder 200 typically includes a DCT unit 210, a quantization unit 215, a DC/AC prediction unit 220, a scanning unit 230 and a variable length encoding unit 235.

Each element included in the encoder 200 performs the inverse functions of the corresponding elements of the decoder 100. This shall be evident to any person of ordinary skill in the art. Briefly, the encoder 200 converts a video signal (i.e. a digital video pixel value) to a frequency value through DCT and quantization in order to performs the encoding. Then, the encoder 200 performs variable length encoding that differentiates the length of a corresponding bit according to the frequency of information to output it in a compressed bitstream form.

Figure 3:
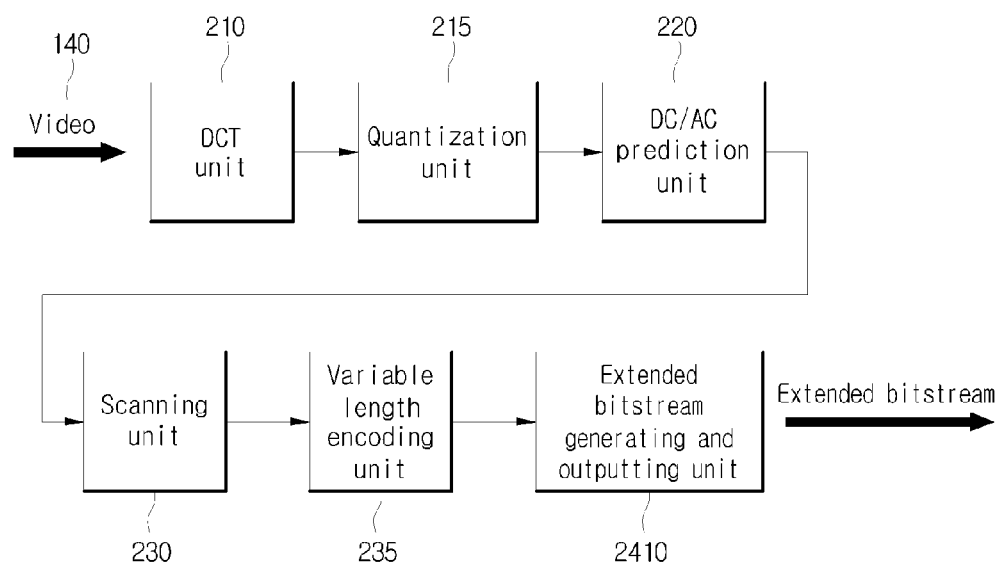
FIG. 3 is a block diagram illustrating the configuration of an encoder in accordance with an embodiment of the present invention.

FIG. 3 is a block diagram illustrating the configuration of an encoder in accordance with an embodiment of the present invention.

The encoder in accordance with an embodiment of the present invention further includes an extended bitstream generating and outputting unit 2410, compared to the conventional encoder 200, which has been described with reference to FIG. 2. The extended bitstream generating and outputting unit 2410 generates a decoder description 313 by using control information (for example, a list of the used functional units and the connection relationship between the functional units, input data of the functional units, syntax information and syntax connection information) from the process of creating a conventional bitstream 316 that is generated by the processing of the previous step. The extended bitstream generating and outputting unit 2410 also generates an extended bitstream 305 by using the generated decoder description 313 and the conventional bitstream 316 and transmits the extended bitstream 305 to a decoder 300.

The encoder is equipped with a toolbox including a plurality of functional units for encoding, and can generate a bitstream according to at least one encoding standard through a sequential combination or organic combination of the functional units included in the toolbox.

It shall be noted that throughout the description, the variable length encoding unit 235 refers to a particular element, for example, an encoding unit, that performs a final encoding process in order to generate the conventional bitstream 316 in the encoder. However, the present invention is not limited to this example, and this shall not limit the scope of the claims of the present invention.

It is assumed in the FIG. 3 that the extended bitstream 305 generated by using the decoder description information 313 and the conventional bitstream 316 is provided to the decoder 300.

However, the decoder description 313 can be provided to the decoder 300 in the form of, for example, data or a bitstream. In this case, an encoded decoder description generating and outputting unit (not shown) is placed behind the variable length encoding unit 235, and it shall be evident that an encoded decoder description that is generated independently of the conventional encoding unit can be provided to the decoder 300.

Figure 4:
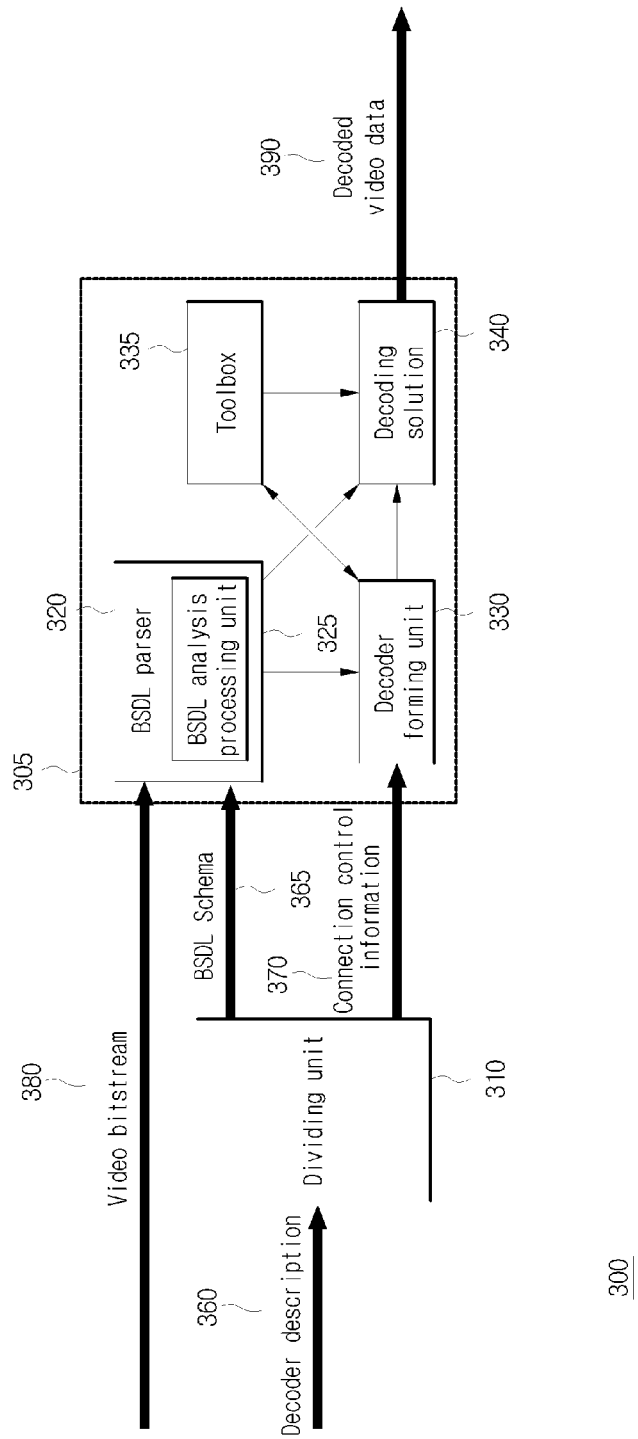
FIG. 4 is a block diagram illustrating the configuration of a decoder in accordance with a first embodiment of the present invention.
Figure 5:
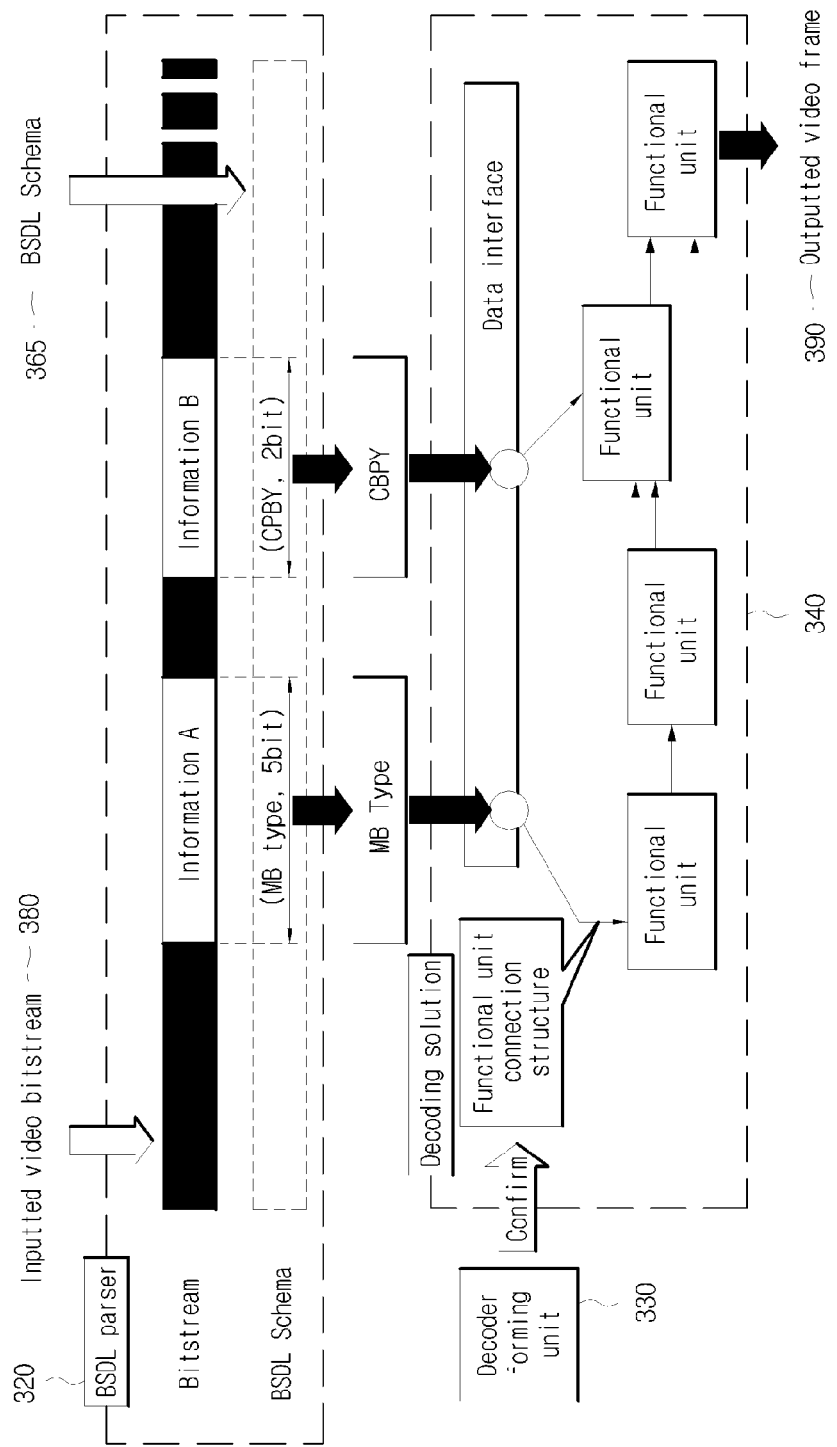
FIG. 5 is a diagram illustrating how a bitstream is processed in a decoding unit in accordance with an embodiment of the present invention.

FIG. 4 is a block diagram illustrating the configuration of a decoder in accordance with a first embodiment of the present invention, and FIG. 5 is an example illustrating how a bitstream is processed in the decoding unit shown in FIG. 4.

A decoder description 360 and a video bitstream 380 shown in FIG. 4 can be, for example, information that is generated and provided by the encoder.

Referring to FIG. 4, the decoder 300 includes a decoding unit 305 and a dividing unit 310. The decoding unit 305 includes a BSDL parser 320, a decoder forming unit 330, a toolbox 335 and a decoding solution 340.

The BSDL parser 320 interprets the syntax information of a video bitstream inputted from the outside by using a BSDL schema inputted by the dividing unit 310. The video bitstream inputted to the BSDL parser 320 is data that is encoded by an encoding method, for example, MPEG-4 and AVS. Throughout the description of the present invention, it shall be evidently understood by any person of ordinary skill in the art that the BSDL parser 320 can interpret the BSDL schema by itself or can be constituted by an external algorithm.

The BSDL parser 320 includes a BSDL analysis processing unit, which is an internal processing unit for redefining the structure of the BSDL parser 320 by reading a BSDL schema written in XML syntax.

Since the redefining rules using the BSDL schema can vary according to a method employed by a producer, the following description will look at the basic purpose only. Firstly, this is for recognizing information about the length and meaning of a bitstream written in the BSDL schema. Secondly, this is for implementing a program routine that is actually operated by a same repetition or condition, by reading a repeating structure and a conditional execution structure defined in the BSDL schema. Accordingly, it is possible that the BSDL parser 320 before being redefined can be defined to have functions to realize the above purpose only, and the process of implementing the BSDL parser 320 that actually operates by utilizing the parsing function described above can be a process of redefining.

The BSDL parser 320 is implemented as a program that can form a flexible data flow by the control of the BSDL analysis processing unit, and can be implemented by using a program language, for example, caltrop actor language (CAL), C, C++ and Java.

A BSDL internal processing unit 325 and the BSDL parser 320 can be implemented without restrictions according to the design conditions set by the decoder designer. Of course, an existing BSDL operating program, like the BSDL reference software, can also be applied. The BSDL reference software is official software produced for the smooth operation of the BSDL standardized by the MPEG, and thus it shall be evident that the BSDL parser 320 having the BSDL schema inputted thereto can also be implemented more easily by using the software.

As described above, the basic structure of the BSDL parser 320 can be designed by various methods selected by the decoder designer. That is, the decoder designer can autonomously choose detailed applications and designs of an algorithm in order to perform the designated function of the BSDL parser 320. However, the BSDL parser 320 can be redefined by the results of reading the BSDL schema, and the redefined results need to collaborate (for example, communicate) with other constituting elements of the decoding unit 305.

The BSDL schema inputted to the BSDL parser 320 describes a detailed breakdown of syntax information included in the bitstream, and the breakdown can include, for example, the length of syntax information, the meaning of syntax information and the appearance condition and the number of repeat appearance of syntax information. Here, the length of syntax information refers to the length of a bit occupied by particular information in the bitstream, and the meaning of syntax information refers to the meaning of the pertinent information. For example, if a particular functional unit requests information A, the meaning of the pertinent information is needed to indentify which one is the information A. Also, the appearance condition or the number of repeat appearance is information that can be added to the BSDL schema in order to define a case where the appearance or the number of repeat appearance of some syntax information can vary depending on the property of the bitstream even though one BSDL schema is used to process a video bitstream of the same specification. For example, the appearance condition may be necessary not to read motion vector information when processing an infra-frame, and the number of repeat appearance can be used for repeating a pertinent block if the macroblock has 6 blocks of the same structure.

As illustrated in FIG. 5, the BSDL analysis processing unit transfers result information to the BSDL parser 320 and supports the BSDL parser 320 to read information included in the bitstream according to the designated order of the BSDL schema.

The BSDL parser 320 converts the contents of an inputted bitstream to meaningful data by referring to the result information provided by the BSDL analysis processing unit and provides the data to the decoder forming unit 330 and/or the decoding solution 340. The meaningful data provided by the BSDL parser 320 to the decoder forming unit 330 and/or the decoding solution 340 can include, for example, an encoded video data having a predetermined macro block size, an AC pred_ flag for intra-coded macroblocks, an MB type & coded block pattern for chrominance (MCBPC) and a coded block pattern for luminance (CBPY). The process for providing such data can be performed regardless of whether the decoder forming unit 330 or the decoding solution 340 operates.

As the decoder decodes a bitstream by using the decoder description 360, the present embodiment is for implementing the decoder description 360 as a structure that uses the BSDL language system and an XML-based format, which is interoperable with the BSDL system. Throughout the description of the present embodiment, it shall be evidently understood by any person of ordinary skill in the art that the decoder description 360 can have an XML-based format, for example, BSDL and CALML, and the BSDL schema is used in the operation of syntax parsing and the CALML is used for controlling the connection between the functional units.

The BSDL is described in the form of an XML document or XML schema including information about the structure and configuration of a bitstream. This language is designed such that each can express at least one video bitstream structure. Although a bitstream describing method that is verified and used in the conventional MPEG standard is still employed, the decoder can obtain a high compatibility with other technologies by using the BSDL. Since a language format and a syntax related to the BSDL are described in MPEG-B part 5, the pertinent description will be omitted.

Below is an example of the configuration of BSDL schema and connection control information using the BSDL and the XML. It shall be obvious that the configuration of the BSDL schema and the connection control information is not limited to this example.

BSDL schema

```
<xsd:element name="VideoObject">
<xsd:complexType>
    <xsd:sequence>
        <xsd:element name="VOStartCode"
type="m4v:StartCodeType"/>
        <xsd:element name="VOL">
            <xsd:complexType>
                <xsd:sequence>
                    <xsd:element name="header"   type="VOLHeaderType"
bs2:ifNext="&volSC;" rvc:port="0"/>
                    <xsd:element name="VOP"
type="VideoObjectPlaneType"
maxOccurs="unbounded"
bs2:ifNext="&vopSC;" rvc:port="1"/>
                </xsd:sequence>
            </xsd:complexType>
        </xsd:element>
    </xsd:sequence>
</xsd:complexType>
</xsd:element>
Connection control information
<Network name="Decoder">
<Package>
<QID>
<ID id="MPEG4 Simple Profile" />
</QID>
</Package>
<Port kind="Input" name="BITSTREAM" />
<Port kind="Ouput" name="YUV" />
<Instance id="1">
<Class name="Parser">
<QID>
<ID id="c" />
</QID>
</Class>
<Note kind="label" name="Stream Parser" />
</Instance>
<Instance id="2">
<Class name="VS">
<QID>
<ID id="c" />
</QID>
<Note kind="label" name="Video Session" />
</Class>
</Instance>
<Connection src="" src-port="BITSTREAM" dst="1"
dst-port="BITSTREAM" />
<Connection src="1" src-port="CSCI" dst="2" dst-port="CSCI" />
<Connection src="1" src-port="DATA" dst="2"
```

BSDL schema

```
dst-port="DATA" />
<Connection src="2" src-port="YUV" dst=""dst-port="YUV" />
</Network>
```

Although it is assumed in the present embodiment that information, for example, the decoder description 360 and the encoded video data 380, are inputted from the outside, it is also possible that at least one of them can be preembedded in a particular element of the decoding unit 305.

Referring to FIG. 4 again, the decoder forming unit 330 controls such that the decoding solution 340 is implemented by using the connection control information inputted by the dividing unit 310 and/or a portion (e.g., at least one of, for example, an encoded video data having a predetermined macro block size, an AC pred_ flag for intra-coded macroblocks, an MB type & coded block pattern for chrominance (MCBPC) and a coded block pattern for luminance (CBPY)) of the bitstream data inputted by the BSDL parser 320.

In other words, the decoder forming unit 330 controls such that a portion or all of the functional units included in the toolbox 335 are loaded and aligned organically in the decoding solution 340 by using, for example, the connection control information. Here, the connection control information can be written in a CAL markup language (CALML). The CALML is an XML format that can describe a decoder structure of a caltrop markup language method, which is currently under discussion by the MPEG. The caltrop markup language is formed to include actors, which are program objects, and the connection between the actors, and the CALML is a structure of the caltrop markup language expressed by the XML format. Some expression examples include an expression example of the BSDL schema and the connection control information, which has been described earlier.

Specifically, the decoder forming unit 330 has a right to access to the toolbox 335, which is constituted by a set of functional units, and forms the decoding solution 340, which corresponds to the result, by setting the input/output connection between the functional units included in the toolbox 335. Here, the input/output connection structure and execution sequence of the functional units are set by referring to the connection control information. Also, some information for identifying the type of an inputted bitstream transferred by the BSDL parser 320 can be used in the operation of connecting the functional units. If the connection structure of the functional units is completely confirmed, the connection structure can be considered as an independent decoder that can analyze and decode all kinds of video bitstream intended by the pertinent decoder description maker if a continuous data input from the outside is assumed. Here, the completed functional unit connection structure can be named the decoding solution 340.

The toolbox 335 includes a plurality of functional units, each of which is implemented so as to perform a predetermined process. Here, each functional unit can also be implemented as a combination of program codes.

The functional units included in the toolbox 335 can be segmented into a plurality of detailed toolboxes, which are classified in accordance with applied purposes. In one example, the functional units can be segmented into a first toolbox having functional units for MPEG included therein and a second toolbox having functional units other than the functional units for MPEG. In another example, the functional units can be segmented into a first toolbox that is a set of functional units for MPEG-2, a second toolbox that is a set of functional units for MPEG-4 and a third toolbox that is a set of functional units for AVS, which is a Chinese compression standard for digital TV.

It is also possible that the toolbox 335 can make independent connections with the decoder forming unit 330 and the decoding solution 340 by realizing the toolbox 335 as a plurality of toolboxes. In this case, although it is not illustrated, the first toolbox, the second toolbox and the like, which have been described earlier, can be implemented as an independent toolbox.

For the convenience of description, the below descriptions focus on a case where a plurality of detailed toolboxes are included in one toolbox 335 or all functional units are included scatterly without forming an assembly.

The toolbox 335 refers to an area in which functional units (FU) realized to perform each function (i.e., predetermined processes) are included. Each of the functional units is loaded to the decoding solution 340 by the connection control of the decoder forming unit 330, thereby forming successive connection operation relationship in order to output encoded video data included in the video bitstream 380 as decoded video data.

Functional units, for example, a de-blocking filter (DF) functional unit, a VOP reconstructor (VR) functional unit, a frame field reording (FFR) functional unit, an intra prediction and picture reconstruction (IPR) functional unit, an inverse transform (IT) functional unit, an inverse quantization (IQ) functional unit, an inverse AC prediction (IAP) functional unit, an inverse scan (IS) functional unit and a DC reconstruction (DCR) functional unit, can be included in the toolbox 335.

An IT 4×4 functional unit, an IQ 4×4 functional unit and a DCR 4×4 functional unit process the blocks having the size of 4×4. This is because although MPEG-1/2/4 process data in 8×8 block size in the transform, quantization and prediction, MPEG-4 AVC may process data in 4×4 block size.

It shall be obvious that the toolbox 335 can include any functional unit for performing a data decoding function regardless of an applied standard, that a necessary functional unit for the developed technology can be added, that an existing functional unit can be modified and that an unnecessary functional unit can be deleted. For example, in the case of additionally needing the IS 4×4 functional unit processing data in 4×4 block size to perform the decoding, the pertinent functional units can be included in the toolbox 335. A special prediction (SPR) functional unit can be also added to perform the intra prediction in the MPEG-4 AVC.

It shall be obviously possible to combine the functional units that are commonly applicable by a plurality of standards among functional units of the toolbox 335. Briefly described below is each function of the functional units, which is evident to any person of ordinary skill in the art.

The DF functional unit is a de-blocking filter of MPEG-4 AVC, and the VR functional unit is a functional unit storing a decoded pixel value.

The FFR functional unit is for an interlaced mode, and the IPR functional unit performs the intra prediction of MPEG-4 AVC and then stores a decoded pixel value. As described above, the intra prediction of MPEG-4 AVC can be performed by the SPR functional unit.

The IT functional unit performs the inverse transform of DC values and AC values, and the IQ functional unit performs the inverse quantization of the AC values.

The IAP functional unit performs the inverse AC prediction of the AC values, and the IS functional unit performs the inverse scan of the AC values. The DCR functional unit performs the inverse DC prediction and the inverse quantization of the DC values.

The decoding solution 340, which is a result generated by the decoder forming unit 330, receives bitstream data divided into a syntax information unit (or encoded video data having a predetermined macroblock size) from the BSDL parser 320.

As illustrated in FIG. 5, the inputted bitstream data can be inputted by a tangible or intangible data interface for inputting/outputting data. If the data interface is software, it can be a particular memory buffer, a virtual port defining the flow of data or a parameter on the program, and if the data interface is hardware, it can be a connection line on the circuit. Besides the ones described above, it is also possible that the data interface can be implemented in various ways.

The inputting of data can be performed continuously (for example, data can be inputted so as to allow parallel processing) by a corresponding interface regardless of whether a particular functional unit performs a process. The decoding solution 340 outputs decoded video data by processing inputted data. As illustrated in FIG. 5, data can be transferred to each functional unit, starting from the data interface, and each functional unit can process the pertinent data and transfer the processed data to a following functional unit. The flow of such data is predefined by the decoder forming unit 330.

The decoding solution 340 can include a storing unit for storing the data (for example, information extracted by the syntax parsing of the bitstream) provided by the BSDL parser 320 and the processed result data of each functional unit. Each functional unit loaded by the control of the decoder forming unit 330 can perform a designated process by using at least one of the data provided by the BSDL parser 320 and the result data of the preceding functional unit. In this case, the following functional unit must recognize that the operation of the preceding functional unit has completed. For this, the decoder forming unit 330 can control whether the following functional unit starts its operation by continuously monitoring whether each functional unit has completed its operation. Moreover, an independent section for each functional unit is provided in the storing unit, and when the processed result data of the preceding functional unit is stored in the storing section of the following functional unit by the control of the decoder forming unit 330, the following functional unit can immediately perform the processing as soon as the data needed for performing the processing is stored in its own storing section. It shall be obviously possible to additionally consider other various method for controlling a time when each functional unit starts the processing.

Of course, the pertinent storing unit can also be included in the decoder forming unit 330, and the decoder forming unit 330 can provide the data (for example, information extracted by the syntax parsing of the bitstream) provided by the BSDL parser 320 and the processed result data of each functional unit to a functional unit currently performing the processing.

Hereinafter, the operation of the decoding unit 305 will be briefly described with reference to FIG. 5.

When an input video bitstream and a BSDL schema are inputted from the outside (here, it is assumed that information A and information B exist at particular points of the bitstream), the BSDL parser 320 recognizes that 5-bit MB type data exists at a point corresponding to the information A and 2-bit CBPY data exists at a point corresponding to the information B, by reading the BSDL schema.

Then, the BSDL parser 320 reads bits as many as the number of designated bits at each point by using the recognized information and transfers the read information to the decoding solution 340 according to the given meaning.

The decoding solution 340 receives data named MB type and CBPY from the BSDL parser 320 and processes the data. As described above, each functional unit in the decoding solution 340 is loaded and realized by the connection control of the decoder forming unit 330.

The data interface included in the decoding solution 320 receives data transferred from the outside and transfers the data to functional units requiring the data by referring to the connection relationship between the functional units that is preformed by the connection control information.

Each functional unit also performs the decoding operation according to a predetermined connection relationship (i.e., a connection relationship for processing data). All the flow of data and the connection relationship between the functional units are subject to a breakdown that is preformed by the decoder forming unit 330. An output video frame is outputted to the outside by sequential processing of each functional unit.

As described above, a storing unit can be provided in the decoder forming unit 330 and/or the decoding solution 340. This is because, while receiving data from the BSDL parser 320, the transferring operation of the data is not stopped and the data is provided in parallel with the decoding operation. Also, each functional unit can extract and use necessary data from the storing unit.

In order for the decoding of encoded video data, the BSDL parser 320 can provide pertinent data to the decoder forming unit 330 and then the decoder forming unit 330 can provide the data to the decoding solution 340, or the BSDL parser 320 can directly provide the pertinent data to the decoding solution 340.

Referring to FIG. 4 again, the dividing unit 310 divides the inputted decoder description 360 into individual information and inputs them into the decoding unit 305. The decoder description 360 inputted into the dividing unit 310 can include a BSDL schema 365 for describing the structure of a bitstream and CALML data 370 for describing the decoding operation of the bitstream. The two types of data described above can be described independently by the XML rule, or the two types of data can be transmitted collectively for efficient operation of the decoder.

Figure 6:
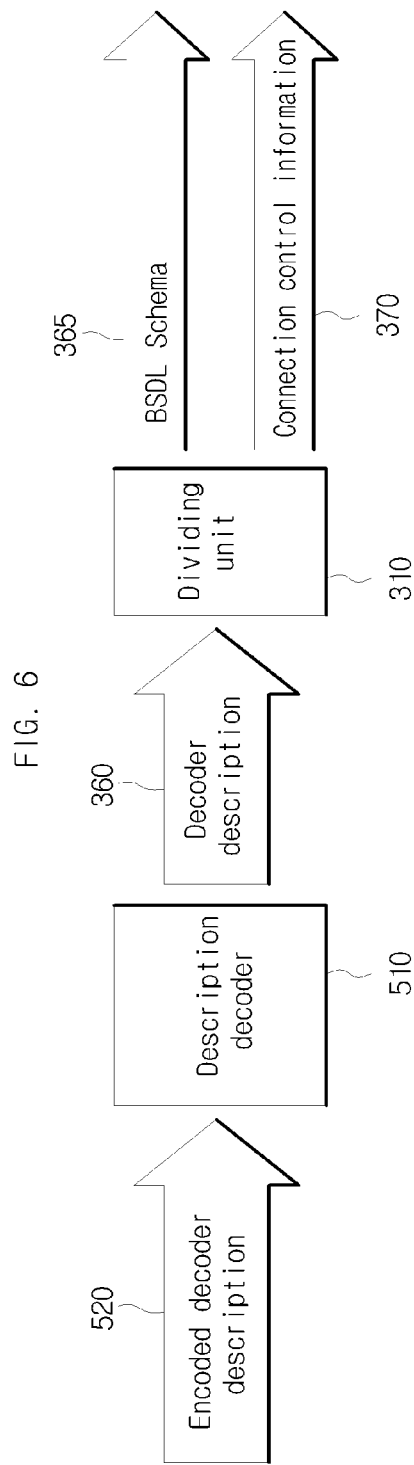
FIG. 6 is a diagram illustrating how a decoder description is inputted in accordance with another embodiment of the present invention.

FIG. 6 is a diagram illustrating how a decoder description is inputted in accordance with another embodiment of the present invention.

As illustrated in FIG. 6, the decoder 300 can further include a description decoder 510. The description decoder 510 can generate a decoder description 360 by decoding an inputted encoded decoder description 520 and generate and provide the decoder description 360 to the dividing unit 310.

The amount of data transmitted and received can be reduced by encoding and transceiving the decoder description 360.

Figure 7:
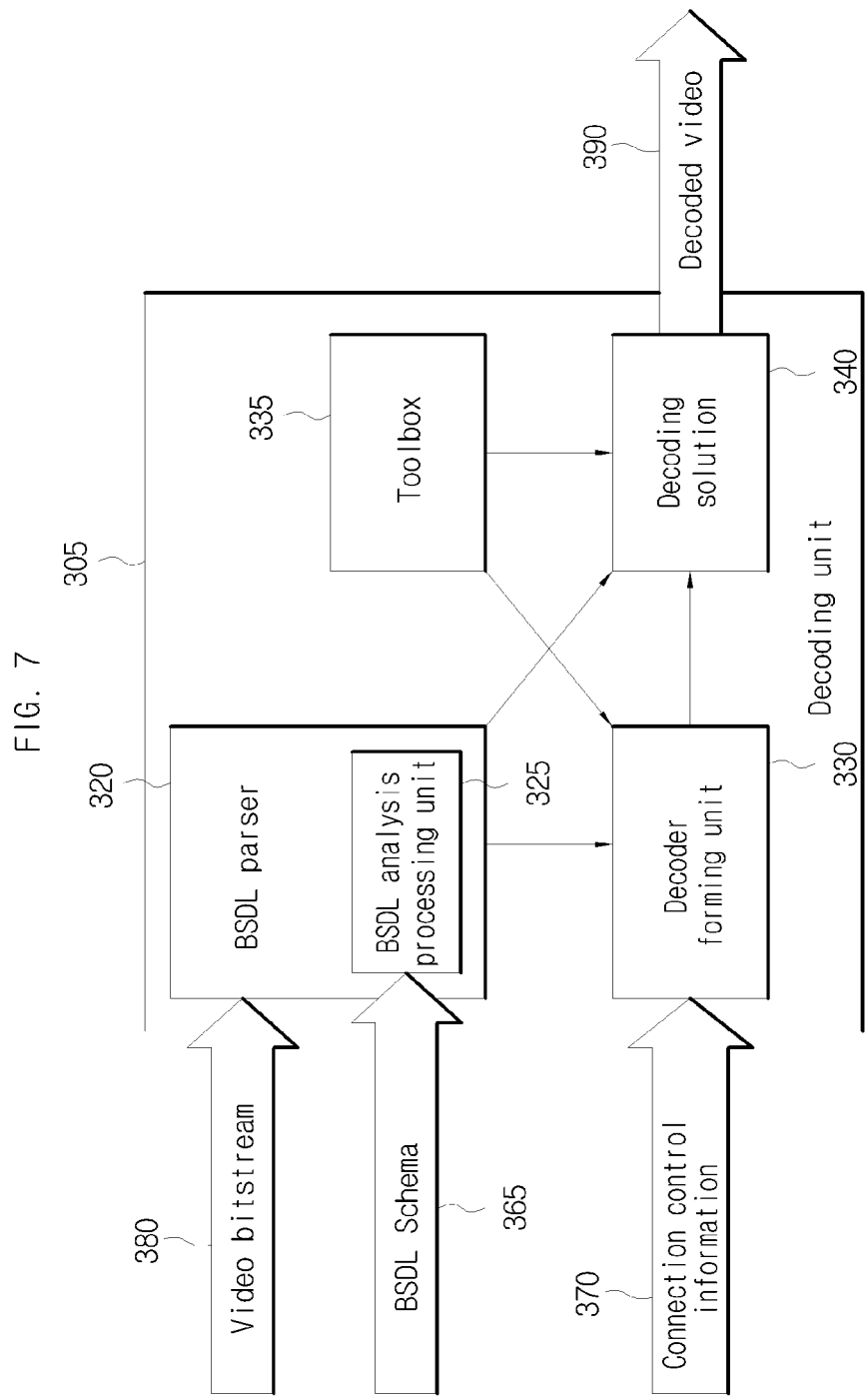
FIG. 7 is a diagram illustrating how a decoder description is inputted in accordance with yet another embodiment of the present invention.

FIG. 7 is a diagram illustrating how a decoder description is inputted in accordance with yet another embodiment of the present invention.

The case in which the decoder description 360 and the video bitstream 380 are inputted into the decoding unit 305 has been described earlier with reference to FIG. 4, and the case in which the encoded decoder description 520 and the video bitstream 380 are inputted into the decoding unit 305 have been described with reference to FIG. 6.

Figure 8:
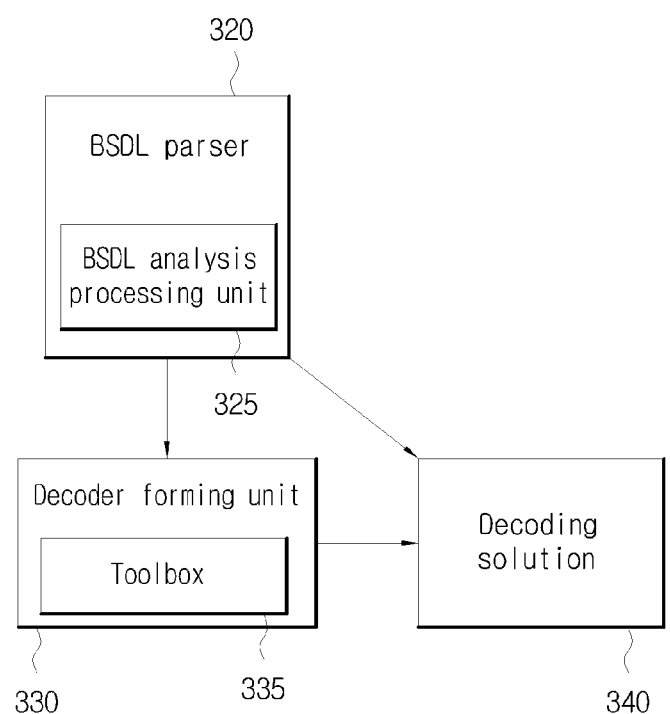
FIG. 8 is a diagram illustrating the configuration of a decoding unit in accordance with another embodiment of the present invention.

However, as illustrated in FIG. 7, it shall be evident that the constituting information of the decoder description 360 can be divided primitively and inputted into the decoding unit 305. In this case, it shall be evident that the dividing unit 310, the decoder description 360 and the like, which have been described earlier, can be omitted. FIG. 8 is a diagram illustrating the configuration of a decoding unit in accordance with another embodiment of the present invention.

The decoding unit 305 that is implemented in such a way that the toolbox 335 and the decoder forming unit 330 are separated from each other has been described earlier with reference to FIGS. 4 to 7.

However, as illustrated in FIG. 8, it shall be evident that the toolbox 335 can be implemented and included as a part of the decoder forming unit 330.

In this case, the decoder forming unit 330 can not only control the connection relationship between functional units but also function to identify functional units to be used. Accordingly, the type of the decoding solution 340 can be implemented in various ways.

Figure 9:
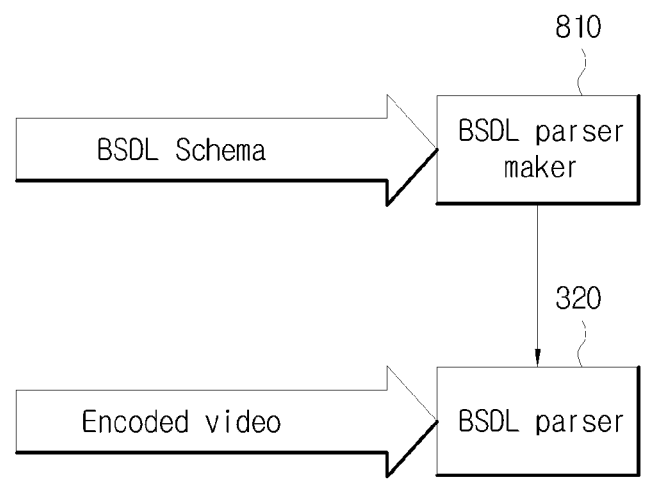
FIG. 9 is a diagram illustrating the configuration of a BSDL parser in accordance with another embodiment of the present invention.

FIG. 9 is a diagram illustrating the configuration of a BSDL parser in accordance with yet another embodiment of the present invention.

The BSDL parser 320 including the BSDL analysis processing unit has been described earlier with reference to FIG. 4.

However, the BSDL parser 320 of the present invention can also be predefined and provided from the outside of the decoder 300 prior to the decoding of the bitstream. Accordingly, the BSDL analysis processing unit, which has been described earlier, can be omitted. Here, a BSDL parser maker 810 can be realized by utilizing an existing application program such as the BSDL reference software.

Hitherto, the previously described embodiments of the present invention have mainly described the BSDL parser that is an independent element and performs a designated operation. However, the BSDL parser can be implemented as one functional unit included in the toolbox or implemented in such a way that the BSDL parser is preincluded in the decoding solution as an independent element. In case the BSDL parser is included in the toolbox, the decoder forming unit must load and control such that the BSDL parser performs a process prior to the operation of functional units, which operate for decoding the bitstream, by using the connection control information. Likewise, in case the BSDL parser is preincluded in the decoding solution, the decoder forming unit must control such that the BSDL parser first performs a process before each loaded functional unit performs a process. In each case, since the operation and function of the BSDL parser is the same as what is described with reference to the related drawings earlier, the pertinent detailed description will be omitted. However, a subject that initially receives a BSDL schema and/or a bitstream may need to be changed to the decoder forming unit and/or the decoding solution.

Although the above description related to a decoding device and a method of analyzing a syntax for decoding a bitstream in accordance with the present invention has been described based on MPEG-4 AVC, it shall be obvious that MPEG-1, MPEG-2, MPEG-4, AVC and other video encoding/decoding standards can be applied without any restriction.

Moreover, it shall be obvious that information included in the connection control information can be described by using not only information related to the connection of functional units for performing the decoding by one standard and information related to the processing operation required for the pertinent functional unit but also information for performing the decoding by a plurality of standards.

For example, it shall be assumed that a plurality of initial frames of a video bitstream are encoded by using MPEG-2, a plurality of following frames are encoded by using MPEG-4 and the other frames are encoded by using MPEG-1. In this case, it shall be obvious that the connection control information for decoding the encoded video data will be defined such that the functional units according to each standard included in the toolbox 335 can be organically coupled and operated, in order that each frame having different encoding methods can be decoded.

Described below is another embodiment of the decoder in accordance with the present invention with reference to the relevant drawings. However, Identical or corresponding elements will be given the same names and the same reference numerals, regardless of the figure number, and any redundant description of the identical or corresponding elements will not be repeated. For example, the toolbox 335, the decoder forming unit 330 and the decoding solution 340 shown in FIG. 11 are the same as those of the first embodiment of the present invention described above.

Figure 10:
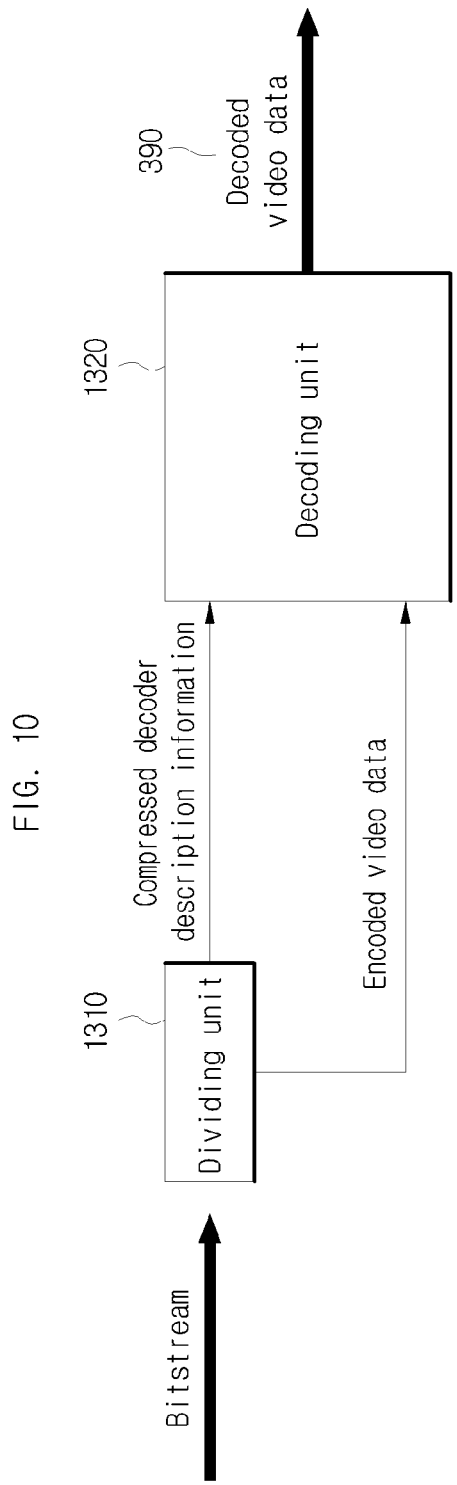
FIG. 10 is a block diagram illustrating the configuration of a decoder in accordance with a second embodiment of the present invention.
Figure 11:
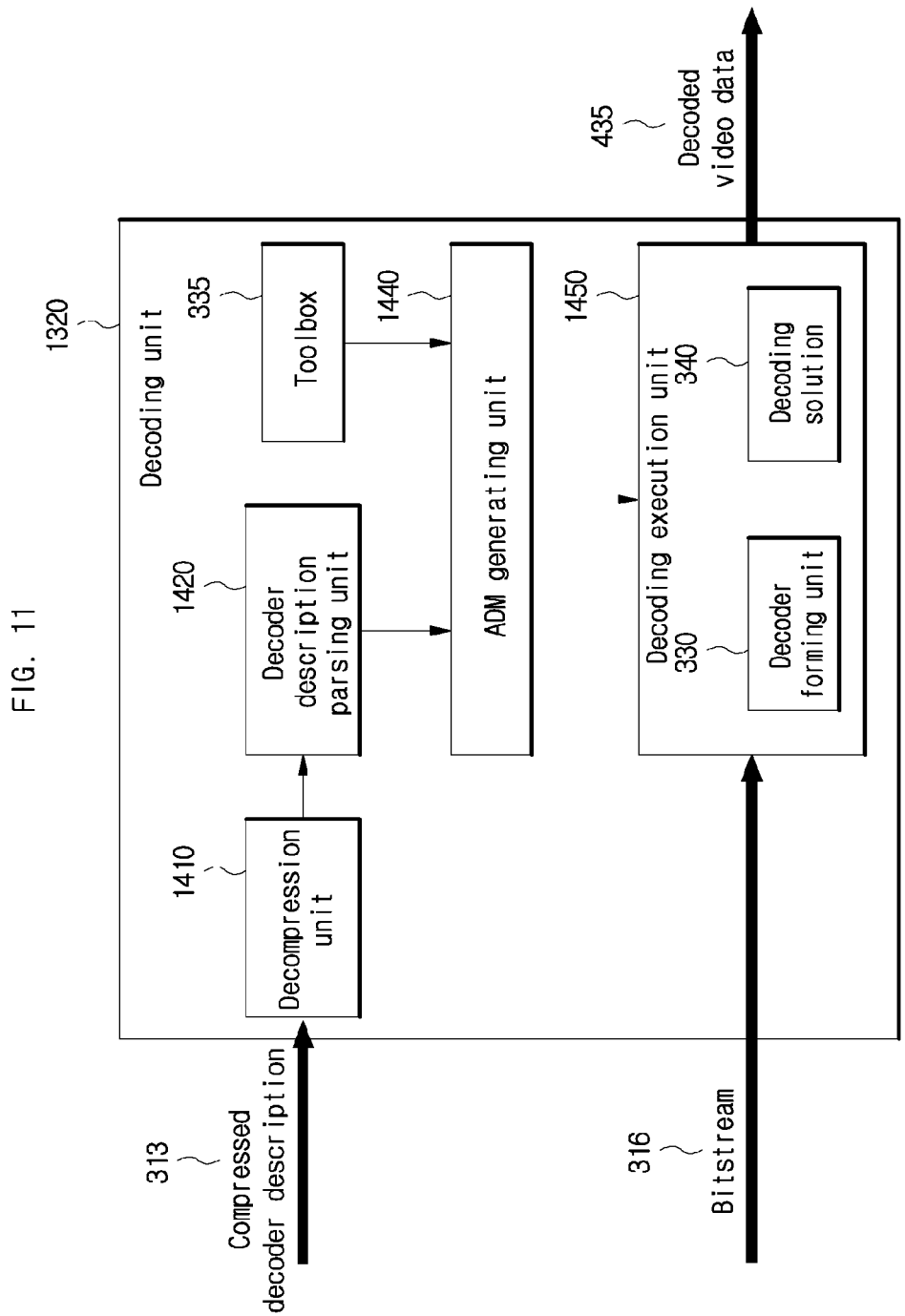
FIG. 11 is a diagram briefly illustrating an example of the configuration of the decoding unit shown in FIG. 10.

FIG. 10 is a block diagram illustrating the configuration of a decoder in accordance with a second embodiment of the present invention, and FIG. 11 is a diagram briefly illustrating an example of the configuration of the decoding unit shown in FIG. 10.

In the present embodiment described below, an inputted decoder description refers to a table-based decoder description (hereinafter, referred to as a compact decoder description language (CDDL)). The inputted decoder description is compressed in a binary form and transferred to the decoder.

The decoder can reconstruct itself by combining necessary functional units according to the type of an inputted bitstream. Accordingly, the decoder of the present invention can decode the pertinent bitstream by forming a decoder corresponding to the inputted bitstream even though the inputted bitstream is encoded in any format. Hereinafter, the decoder of the present invention will be described in detail with reference to the relevant drawings.

As described above, a decoder description and a bitstream are provided to the decoder. The decoder description can be provided to the decoder in the form of the bitstream 305, which is realized through integration with a bitstream, or in the form of independent data. Of course, in case that a particular storing unit of the decoder prestores information corresponding to a decoder description, providing the decoder description can be omitted. However, the case that the pertinent data is included in a bitstream before being provided to the decoder will be described below.

The decoder in accordance with another embodiment of the present invention includes a dividing unit 1310 and a decoding unit 1320. It shall be obvious that at least one of the elements (e.g., the dividing unit 1310, the decoding unit 1320 or at least one element included in the decoding unit 1320) can be realized as a software program (or a combination of program codes), which is designed to perform a function described below.

The dividing unit 1310 divides an inputted bitstream into a compressed decoder description 313 and encoded video data 316 and inputs them into the decoding unit 1320.

The dividing unit 1310 can input the compressed decoder description 313 into a decompression unit 1410 and input the encoded video data 316 into a decoding execution unit 1450. As described above, if the compressed decoder description 313 and the encoded video data 316 are respectively inputted as independent data, the dividing unit 1310 can be omitted. Here, the encoded video data 316 can have a format that is same as or similar to that of the bitstream 105 shown in FIG. 1.

The decoding unit 1320 outputs decoded video data 390 by decoding the encoded video data 316 through the use of the compressed decoder description 313 inputted by the dividing unit 1310. Hereinafter, the configuration of the decoding unit 1320 will be described in detail with reference to FIG. 11.

Referring to FIG. 11, the decoding unit 1320 includes the decompression unit 1410, a decoder description parsing unit 1420, the toolbox 335, an ADM generating unit 1440 and the decoding execution unit 1450. Here, the decoding execution unit 1450 includes the decoder forming unit 330 and the decoding solution 340.

The decompression unit 1410 decompresses the compressed decoder description 313 inputted by the dividing unit 1310 according to a particular decompression method and outputs the decompressed decoder description 313 into the decoder description parsing unit 1420. Specifically, the decoder description 313 is compressed in a binary form according to a particular rule, and the decompression unit 1410 decompresses and outputs a corresponding CDDL-based decoder description by decoding the decoder description 313 compressed in a binary form.

The decoder description parsing unit 1420 converts the decompressed CDDL-based decoder description to an XML-based decoder description described in an XML format and output it to the ADM generating unit 1440. Of course, it shall be evident that the decoder description parsing unit 1420 can be omitted and the decompression unit 1410 can directly convert the inputted binary data to the XML-based decoder description and output the XML-based decoder description.

The ADM generating unit 1440 generates an abstract decoding model (ADM) including information on a plurality of functional units having at least one input/output port and the connection information between the functional units.

The ADM generating unit 1440 generates an ADM that can decode a bitstream by combining the received functional units according to syntax control information, connection control information and parsing control information.

The decoding execution unit 1450 can decode an inputted video by using pertinent functional units stored in the toolbox 335 through the decoder forming unit 330 and the decoding solution 340 using the ADM, as described above. Also, it is possible that the decoding execution unit 1450 can decode the inputted video by directly receiving the XML-based decoder description.

Hereinafter, a CDDL-based decoder description (DD) in accordance with an embodiment of the present invention will be described.

The CDDL-based decoder description is classified into an FU networking table group, which describes an FU network that is a connection relationship between FUs necessary for forming an ADM and/or a decoding solution, and a syntax parsing table group, which is for syntax parsing.

The FU networking table group includes a virtual network table (VNT), a functional unit instance table (FUIT), a network connection table (NCT), a parameter table (PT), an expression table (ET) and a type table (TT).

The syntax parsing table group includes a control signal and context information table (CSCIT), a syntax element table (SET), a syntax rule table (SRT) and a default value table (DVT).

Hereinafter, the FU networking tables will be described with reference to the related drawings before the syntax parsing tables are described.

FIG. 12 is a diagram illustrating the structure of an FU networking table in accordance with an embodiment of the present invention.

The FU networking table used in the CDDL-based decoder description is described in a binary bitstream according to such a structure as shown in FIG. 12.

Each table is provided with a table start code and an inherent table code, which is for indentifying tables. Then, the substantial content of each table is described in a binary form to form a bitstream. Then, a table end code is added when the whole content of one table is completely written in a bitstream.

The table start code is a fixed value and consists of a 24-bit binary number (111111111111111111111110), and the table end code is a fixed value and consists of a 24-bit binary number (111111111111111111111111). In order to indentify an inherent table code, the table code consists of a 4-bit binary number as shown in the table 1 below.

TABLE 1

| Table | Code |
| --- | --- |
| VNT | 0100 |
| NCT | 0101 |
| PT | 0110 |
| FUIT | 0111 |
| TT | 1000 |
| ET | 1001 |
| reserved | 1010~1111 |

FIG. 13 is a diagram illustrating the structure of a virtual network table (VNT) in accordance with an embodiment of the present invention.

As illustrated in FIG. 13, the VNT includes fields of FUID, VN name, version, INPUT ports, OUTPUT ports and QID name.

There is a possibility that networks, which are functional unit sets, have the same structures and input data is not identical to output data. As such, a form that makes necessary subobjects (for example, offspring and inherited objects) based on a basic template after forming the basic template object using the concept of inheritance is formed in order to efficiently realize a plurality of networks (i.e., objects) having the same structures but different inputs and outputs. The VNT describes information corresponding to the basic template.

Since there is a possibility that a functional unit may exist in the toolbox or be new one that does not exist in the toolbox, the FUID uses an index number that indicates the placement of the functional unit in the toolbox. If the functional unit exists in the toolbox, a FUID flag is set to be 1, and if the functional unit does not exist in the toolbox, the FUID flag is set to be 0. In case the FUID flag is set to be 0, the FUID is not described and skips the step.

The VN name represents the name of a functional unit. When the name is written in a binary bitstream, the length of text string of the name is first described (8 bits), and then each alphabetic letter is written one by one. Each alphabetic letter can be expressed in ASCII code.

The version represents the version of a functional unit. If the version of a functional unit exists, a version flag is set to be 1, and if the version of the functional unit does not exist, the version flag is set to be 0. When the version is written in a binary bitstream, the length of text string of the version is first described (8 bits), and then each alphabetic letter is written one by one. Each alphabetic letter can be expressed in ASCII code.

There can be a plurality of input ports. Before the name of one input port is written in a binary form, the name length of the input port is displayed as 8-bit, and then the alphabetic letters of the input port are written one by one. Since there is a possibility that a type may exist or not exist for the input port, a type flag for the input port indicates the presence of the type. If the type flag is set to be 1, the type table index is described as 8-bit, and if the type flag is not set to be 1, the type table index is not described and skips the step. If there are a plurality of input ports, an INPUT ports flag indicates whether the descriptions of all of the input ports are completed or not completed after the description of one input port is finished. If the descriptions of all of the input ports are completed, the INPUT ports flag is set to be 1, and if there are still some input ports to be described, the INPUT ports flag is set to be 0. Then, the remaining input ports are described by the same method.

Also, there can be a plurality of output ports, and the output ports are written in a binary bitstream, like the input ports.

The QID name represents a text string used as an appropriate identifier for indentifying functional units. Since not every functional unit has the QID name, the presence of the QID name is described as 1-bit. If a flag is set to be 0, the QID name is not described and skips the step. If the flag is set to be 1, the length of the QID name is described as 8-bit. Then, the QID name is written in alphabetic letters one by one. Each alphabetic letter can be expressed in ASCII code.

The VNT inputted in a binary bitstream as described above is converted to an XML-based decoder description in the decompression unit 1410 and/or the decoder description parsing unit 1420 according to a particular rule. In other words, an abbreviated word (i.e., alphabetic letters) representing the VNT is used, and the content of the VNT starts with "{" and ends with "}". Each field of the VNT is kept separate from another by using ",", and one row starts with "(" and ends with ")". If one field has a plurality of values, it starts with "{" and ends with "}". Expression of letters is described inbetween quotation marks """".

The VNT is represented in a text form as shown in the following example.

```
{
    ([FU_ID,] (VN Name), (Version),{INPUT PORTS},
    {OUTPUT PORTS}, [QID name]),
    ...
}
```

Below is an example of the VNT for MPEG-4 SP, which supports the XML format.

```
VNT
{
    //0
    (-, "decoder", -, "mpeg", -, {"video_Y", -, "video_U", -, "video_V", -},
"mpeg4"),
        (1, "parser", -, "BITS", -, {"BTYPE_Y", -, "BTYPE_U", -, "BTYPE_V", -,
"MV_Y", -, "MV_U", -, "MV_V", -, "B_Y", -, "B_U", -, "B_V", -},-),
        (-, "intra_FUs_16x16_Y", -, {"BTYPE", -, "QFS", -}, "f", -, "mpeg4"),
        (-, "intra_FUs_8x8_C", -, {"BTYPE", -, "QFS", -}, "f", -, "mpeg4"),
```

```
    (-, "motion_Y", -, {"MV", -, "BTYPE", -, "TEX", -}, "VID", -, "mpeg4"),
    //5
    (-, "motion_U", -, {"MV", -, "BTYPE", -, "TEX", -}, "VID", -, "mpeg4"),
    (-, "motion_V", -, {"MV", -, "BTYPE", -, "TEX", -}, "VID", -, "mpeg4"),
    (-, "byte2bit", -, "in8", -, "BITS", -, -),
    (2, "Address16x16', -, {"MV", -, "BTYPE", -}, {"WA", -, "RA", -, "halfpel",
-}, -),
    (3, "Framebuf", -, {"RA", -, "WA", -, "WD", -}, "RD", -, -),
    //10
    (4, "Interpolate", -, {"RD", -, "halfpel", -}, "MOT", -, -),
    (5, "Add", -, {"MOT", -, "TEX", -, "BTYPE", -}, "VID", -, -),
    (6, "Address8x8", -, {"MV", -, "BTYPE", -}, {"WA", -, "RA", -, "halfpel", -},
-),
    (7, "DCSplit", -, "IN", -, {"DC", -, "AC", -}, -),
    (-, "DCR_16x16_L", -, {"BTYPE", -, "QFS_DC", -}, {"QF_DC", -, "PTR", -,
"AC_PRED_DIR", -, "SIGNED", -, "QUANT", -}, "cal"),
    //15
    (8, "InverseScan", -, {"QFS_AC", -, "AC_PRED_DIR ", -}, "PQF_AC", -, -),
    (9, "IAP_16x16", -, {"PQF_AC", -, "PTR", -, "AC_PRED_DIR", -}, "QF_AC",
-, -),
    (10, "Dequant", -, {"AC", -, "DC", -, "QP", -}, "OUT", -, -),
    (11, "idct2d", -, {"\in\", -, "signed", -}, "out", -, -),
    (-, "DCR_8x8_C", -, {"BTYPE", -, "QFS_DC", -}, {"QF_DC", -, "PTR", -,
"AC_PRED_DIR", -, "SIGNED", -, "QUANT", -}, "cal"),
    //20
    (12, "IAP_8x8", -, {"PQF_AC", -, "PTR", -, "AC_PRED_DIR", -}, "QF_AC",
-, -),
    (13, "DCR_addressing_8x8", -, "BTYPE", -, {"A", -, "B", -, "C", -}, -),
    (14, "DCR_invpred_8x8_C", -, {"BTYPE", -, "A", -, "B", -, "C", -, "QFS_DC",
-}, {"QF_DC", -, "PTR", -, "AC_PRED_DIR", -, "SIGNED", -, "QUANT", -}, -),
    (15, "DCR_addressing_16x16", -, "BTYPE", -, {"A", -, "B", -, "C", -}, -),
    (16, "DCR_invpred_16x16_L", -, {"BTYPE", -, "A", -, "B", -, "C", -,
"QFS_DC", -}, {"QF_DC", -, "PTR", -, "AC_PRED_DIR", -, "SIGNED", -, "QUANT",
-}, -)
    }
```

Figure 14:
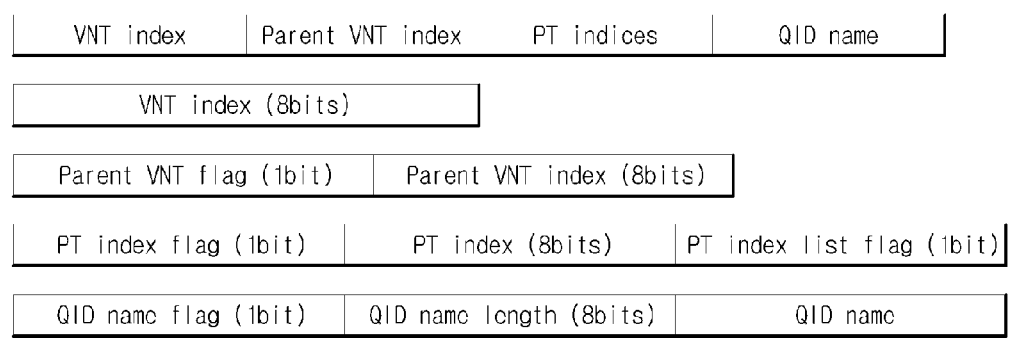
FIG. 14 is a diagram illustrating the structure of a FUIT table in accordance with an embodiment of the present invention.

FIG. 14 is a diagram illustrating the structure of a FUIT in accordance with an embodiment of the present invention.

As illustrated in FIG. 14, the FUIT includes fields of VNT index, Parent VNT index, Parameter indices and QID name. The FUIT stores main information for generating objects that are used as actually required networks based on a basic template, which is VNT information. The actually required networks can be represented by using a subobject (for example, offspring, an inherited object and an instance) derived from the basic template.

The VNT index is an index of the VNT for representing one functional unit.

The parent VNT index represents a basic template necessary for an instance. The parent VNT index is an index for referring to the VNT. If the flag is set to be 0, the VNT index is not described and skips the step.

The PT indices represent index lists representing a plurality of parameters that belong to one functional unit. The functional unit may have no parameter at all or may have a plurality of parameters. The presence of parameter is indicated by a flag, and then a parameter table (PT) index having parameter information is described. If the description of the parameter information is completed, the flag is set to be 1, and if there are still some parameter table indices to be described, the flag is set to be 0. Then, the remaining parameter table indices are described by the same method.

The QID name represents a text string used as an appropriate indentifier for indentifying functional units. Since not every functional unit has the QID name, the presence of the QID name is described as 1-bit. If a flag is set to be 0, the QID name is not described and skips the step. If the flag is set to be 1, the length of the QID name is described as 8-bit. Then, the QID name is written in alphabetic letters one by one. Each alphabetic letter can be expressed in ASCII code.

The FUIT is represented in a text form as shown in the following example.

```
{
    (VNT Index, [Parent VNT Index], {PT Indexes}, [QID name]),
    ...
}
```

Below is an example of the FUIT for the MPEG-4 SP, which supports the XML format.

```
FUIT
{
    (1, 0, {21, 22, 23, 24, 25, 26, 27, 28, 29, 30, 31, 32, 33, 34, 35,
36, 37}, "mpeg4"),
    (2, 0, {21, 24, 25, 23, 26, 27, 28, 29, 33, 34, 39}, "mpeg4"),
    (3, 0, {21, 24, 25, 23, 26, 27, 28, 29, 33, 34, 39}, "mpeg4"),
    (3, 0, {21, 24, 25, 23, 26, 27, 28, 29, 33, 34, 39}, "mpeg4"),
    (4, 0, {38, 21, 40, 37, 49, 41, 7, 25, 26, 27, 29, 30, 35}, "mpeg4"),
    ...
    ...
    (24, 14, {52, 21, 24, 25, 23, 26, 27, 28, 29, 33, 34, 39}, "cal")
}
```

FIG. 15 is a diagram illustrating the structure of a PT in accordance with an embodiment of the present invention.

As illustrated in FIG. 15, the PT includes fields of Parameter name, Parent VNT index, ET index and TT index.

Although parameter is not syntax generated from a bitstream, the parameter is used to generate data that is required for forming a functional unit. Since the parameter is not syntax, the parameter is unable to be transferred through the port transmitting data. The parameter can be transferred to a network, which is a functional unit set, to a subnetwork included in the network. Information related to the parameter of one functional unit is described in the PT index included in the FUIT. The PT has generation information of each parameter.

In the field of parameter name, each parameter has a peculiar name. The length of parameter name is described as 8-bit. Then, the parameter name is written in alphabetic letters one by one. Each alphabetic letter can be expressed in ASCII code.

In the field of parent VNT index, a parameter can be used in an upper network functional unit, which is a basic template, and can also be used in a lower functional unit instance generated by the basic template. In case the parameter is used in the upper network, the flag is set to be 1, and an index to be referenced at the VNT is described. In case the parameter is used in the lower instance, the flag is set to be 0, and the VNT index is not described.

The ET index can express parameter forms. Here, if the expression for the parameter exists, the flag is set to be 1, and if it does not exist, the flag is set to be 0. In case the flag is set to be 0, the ET index is not described and skips the step. The content of the expression refers to the indices of the ET.

The TT index represents the types of parameters. If a flag representing the presence of the types of parameters is set to be 1, the TT index is described, and if not, the TT index is not described and skips the step. The content of the type refers to the indices of the TT.

The PT is represented in a text form as shown in the following example.

```
{
    (Parameter Name, [VNT Index], [Expr Index], [Type Index]),
    ...
}
```

Below is an example of the PT for the MPEG-4 SP, which supports the XML format.

```
PT
{
//0
("MAXW_IN_MB", 0, 0, -),
("MAXH_IN_MB", 0, 1, -),
("ADDR_SZ", 0, 2, -),
("PIX_SZ", 0, 3, -),
("MV_SZ", 0, 3, -),
//5
("SAMPLE_COUNT_SZ", 0, 4, -),
("SAMPLE_SZ", 0, 5, -),
("MB_COORD_SZ", 0, 4, -),
("BTYPE_SZ", 0, 0, -),
("NEWVOP", 0, 6, -),
//10
("INTRA", 0, 7, -),
("INTER", 0, 8, -),
("QUANT_MASK", 0, 9, -),
("ROUND_TYPE", 0, 10, -),
("FCODE_MASK", 0, 11, -),
//15
("FCODE_SHIFT", 0, 12, -),
("ACPRED", 0, 13, -),
("ACCODED", 0, 14, -),
("FOURMV", 0, 15, -),
("MOTION", 0, 4, -),
//20
("QUANT_SZ", 0, 12, -),
("MAXW_IN_MB", -, 16, -),
("SAMPLE_COUNT_SZ", -, 17, -),
("SAMPLE_SZ", -, 18, -),
("MB_COORD_SZ", -, 19, -),
//25
("BTYPE_SZ", -, 20, -),
("NEWVOP", -, 21, -),
("INTRA", -, 22, -),
("INTER", -, 23, -),
("QUANT_MASK", -, 24, -),
//30
("ROUND_TYPE", -, 25, -),
("FCODE_MASK", -, 26, -),
("FCODE_SHIFT", -, 27, -),
("ACPRED", -, 28, -),
("ACCODED", -, 29, -),
//35
("MOTION", -, 30, -),
("FOURMV", -, 31, -),
("MV_SZ", -, 32, -),
("SEARCHWIN_IN_MB", -, 33, -),
("QUANT_SZ", -, 34, -),
//40
("MAXH_IN_MB", -, 35, -),
("PIX_SZ", -, 36, -),
("BUF_SZ", 4, 37, -),
("FLAG_SZ", 4, 15, -),
("BUF_SZ", 5, 37, -),
//45
("FLAG_SZ", 5, 15, -),
("BUF_SZ", 6, 37, -),
("FLAG_SZ", 6, 15, -),
("FLAG_SZ", -, 38, -),
("ADDR_SZ", -, 39, -),
//50
("BUF_SZ", -, 40, -),
("SEARCHWIN_IN_MB", -, 41, -),
("DCVAL", -, 7, -)
}
```

FIG. 16 is a diagram illustrating the structure of an NCT in accordance with an embodiment of the present invention.

As illustrated in FIG. 16, the NCT includes fields of Src FUIT index, Dst FUIT index, Src port name, Dst port name, Attribute name, Attribute value and ET Index.

The NCT has information related to a port capable of functioning as a path through which data can be transmitted between functional units. Inherent names can be allotted to an input port and an output port that perform the input and the output, respectively.

The Src FUIT index needs to show where the data comes from when the data is transmitted from one functional unit to another functional unit. An index of the FUIT can be used to indicate the functional unit in which data starts. If the start of a bitstream is not the functional unit itself, like the input file, it can be expressed by "-". Accordingly, a flag is used to indicate whether an index refers to the FUIT, and the FUIT index is described. If the flag is set to be 0, the FUIT index is not described and skips the step.

The Dst FUIT index represents the functional unit in which data arrives, and represents the FUIT index of the functional unit in which data arrives. If the start of a bitstream is not the functional unit itself, like the output file, it can be expressed by "-". Accordingly, a flag is used to indicate whether an index refers to the FUIT, and the FUIT index is described. If the flag is set to be 0, the FUIT index is not described and skips the step.

The Src port name and Dst port name represent the name of a port in which data is transmitted. The output port of a functional unit becomes a start port of data, and the input port of another functional unit becomes a port in which data arrives. It is possible that the names of the output port and the input port through which data is transmitted can be same.

Accordingly, a same flag, indicating whether the names of the two transmission ports are identical to each other, described. If the same flag is set to be 0, the Dst port name is not described. When the name is written in a binary bitstream, the length of text string of the name is first described (8 bits), and then each alphabetic letter is written one by one. Each alphabetic letter can be expressed in ASCII code.

In the field of attribute name, connection attribute information can be added in the connection between networks. If the name of such connection attribute information exists, the flag is set to be 1, and if the name does not exist, the flag is set to be 0. If the flag is set to be 0, the attribute name is not described and skips the step. When the name of the connection attribute information is written in a binary bitstream, the length of text string of the name is first described (8 bits), and then each alphabetic letter is written one by one. Each alphabetic letter can be expressed in ASCII code.

There is a case that the attribute value is described if the name of the connection attribute information exists in the connection between networks. If the flag is set to be 0, the attribute value is not described and skips the step. Accordingly, the presence of the attribute value is represented by the flag, and the length of text string that represents the attribute value is described as 8-bit. Then, each alphabetic letter is written one by one, and each alphabetic letter can be expressed in ASCII code.

In the field of ET index, an additional expression can be formed for the connection between networks. Here, if an additional expression exists, the flag is set to be 1, and if an additional expression does not exist, the flag is set to be 0. In case the flag is set to be 0, the ET index is not described and skips the step. The content of the expression refers to the indices of the ET.

The NCT is represented in a text form as shown in the following example.

```
{
    ([Src FUIT Index], [Dst FUIT Index], Src Port, Dst Port,
[Attribute Name], [Attribute Value], [Expr Index]),
    ...
}
```

Below is an example of the NCT for the MPEG-4 SP, which supports the XML format.

```
NCT
{
//FUIT 0-7
(-, 7, "mpeg", "in8", -, -, -),
(7, 0, "out", "BITS", -, -, -),
(0, 1, "BTYPE_Y", "BTYPE", -, -, -),
*376(0, 1, "B_Y", "QFS", -, -, -),
(0, 2, "BTYPE_U", "BTYPE", -, -, -),
(0, 2, "B_U", "QFS", -, -, -),
(0, 3, "BTYPE_V", "BTYPE", -, -, -),
(0, 3, "B_V", "QFS", -, -, -),
(1, 4, "f", "TEX", -, -, -),
(2, 5, "f", "TEX", -, -, -),
(3, 6, "f", "TEX", -, -, -),
(0, 4, "MV_Y", "MV", -, -, -),
(0, 4, "BTYPE_Y", "BTYPE", -, -, -),
(0, 5, "MV_U", "MV", -, -, -),
(0, 5, "BTYPE_U", "BTYPE", -, -, -),
(0, 6, "MV_V", "MV", -, -, -),
(0, 6, "BTYPE_V", "BTYPE", -, -, -),
(4, -, "VID", "video_Y", -, -, -),
(5, -, "VID", "video_U", -, -, -),
(6, -, "VID", "video_V", -, -, -),
//FUIT 8 9 10 11
(-, 8, "MV", "MV", -, -, -),
(-, 8, "BTYPE", "BTYPE", -, -, -),
(-, 11, "TEX", "TEX", -, -, -),
(-, 11, "BTYPE", "BTYPE", -, -, -),
(8, 9, "WA", "WA", -, -, -),
(8, 9, "RA", "RA", -, -, -),
(8, 10, "halfpel", "halfpel", -, -, -),
*401(9, 10, "RD", "RD", -, -, -),
(10, 11, "MOT", "MOT", -, -, -),
(11, 9, "VID", "WD", -, -, -),
(11, -, "VID", "VID", -, -, -),
//FUIT 12 13 14 15
(-, 12, "MV", "MV", -, -, -),
(-, 12, "BTYPE", "BTYPE", -, -, -),
(-, 15, "TEX", "TEX", -, -, -),
(-, 15, "BTYPE", "BTYPE", -, -, -),
(12, 13, "WA", "WA", -, -, -),
(12, 13, "RA", "RA", -, -, -),
(12, 14, "halfpel", "halfpel", -, -, -),
(13, 14, "RD", "RD", -, -, -),
(14, 15, "MOT", "MOT", -, -, -),
(15, 13, "VID", "WD", -, -, -),
(15, -, "VID", "VID", -, -, -),
//FUIT 16 17 18 19
(-, 16, "MV", "MV", -, -, -),
(-, 16, "BTYPE", "BTYPE", -, -, -),
(-, 19, "TEX", "TEX", -, -, -),
(-, 19, "BTYPE", "BTYPE", -, -, -),
(16, 17, "WA", "WA", -, -, -),
(16, 17, "RA", "RA", -, -, -),
(16, 18, "halfpel", "halfpel", -, -, -),
(17, 18, "RD", "RD", -, -, -),
(18, 19, "MOT", "MOT", -, -, -),
(19, 17, "VID", "WD", -, -, -),
(19, -, "VID", "VID", -, -, -),
//FUIT 20 21 22 23 24 25
(-, 20, "QFS", "IN", -, -, -),
(20, 21, "DC", "QFS_DC", -, -, -),
(20, 22, "AC", "QFS_AC", -, -, -),
(-, 21, "BTYPE", "BTYPE", -, -, -),
(21, 22, "AC_PRED_DIR", "AC_PRED_DIR", -, -, -),
(22, 23, "PQF_AC", "PQF_AC", -, -, -),
(23, 24, "QF_AC", "QF_AC", -, -, -),
(24, 25, "OUT", "IN", -, -, -),
(21, 23, "PTR", "PTR", -, -, -),
(21, 23, "AC_PRED_DIR", "AC_PRED_DIR", -, -, -),
(21, 24, "QUANT", "QP", -, -, -),
(21, 24, "QF_DC", "DC", -, -, -),
(21, 25, "signed", "signed", -, -, -),
(25, -, "out", "f", -, -, -),
//FUIT 26 27 28 29 30 31
(-, 26, "QFS", "IN", -, -, -),
(26, 27, "DC", "QFS_DC", -, -, -),
(26, 28, "AC", "QFS_AC", -, -, -),
(-, 27, "BTYPE", "BTYPE", -, -, -),
(27, 28, "AC_PRED_DIR", "AC_PRED_DIR", -, -, -),
(28, 29, "PQF_AC", "PQF_AC", -, -, -),
(29, 30, "QF_AC", "QF_AC", -, -, -),
(30, 31, "OUT", "IN", -, -, -),
(27, 29, "PTR", "PTR", -, -, -),
(27, 29, "AC_PRED_DIR", "AC_PRED_DIR", -, -, -),
(27, 30, "QUANT", "QP", -, -, -),
(27, 30, "QF_DC", "DC", -, -, -),
(27, 31, "signed", "signed", -, -, -),
(31, -, "out", "f", -, -, -),
//FUIT 32 33
(-, 32, "BTYPE", "BTYPE", -, -, -),
(-, 33, "QFS_DC", "QFS_DC", -, -, -),
(-, 33, "BTYPE", "BTYPE", -, -, -),
(32, 33, "A", "A", -, -, -),
(32, 33, "B", "B", -, -, -),
(32, 33, "C", "C", -, -, -),
(33, -, "PTR", "PTR", -, -, -),
(33, -, "AC_PRED_DIR", "AC_PRED_DIR", -, -, -),
(33, -, "SIGNED", "SIGNED", -, -, -),
(33, -, "QF_DC", "QF_DC", -, -, -),
(33, -, "QUANT", "QUANT", -, -, -),
//FUIT 34 35
```

-continued

```
(-, 34, "BTYPE", "BTYPE", -, -, -),
(-, 35, "QFS_DC", "QFS_DC", -, -, -),
(-, 35, "BTYPE", "BTYPE", -, -, -),
(34, 35, "A", "A", -, -, -),
(34, 35, "B", "B", -, -, -),
(34, 35, "C", "C", -, -, -),
(35, -, "PTR", "PTR", -, -, -),
(35, -, "AC_PRED_DIR", "AC_PRED_DIR", -, -, -),
(35, -, "SIGNED", "SIGNED", -, -, -),
(35, -, "QF_DC", "QF_DC", -, -, -),
(35, -, "QUANT", "QUANT", -, -, -)
}
```

FIG. 17 is a diagram illustrating the structure of an ET in accordance with an embodiment of the present invention.

As illustrated in FIG. 17, the ET includes fields of Kind, Literal kind, Literal value, Variable name, Operator, Child ET index and Args ET index.

The ET is not used for obtaining information from a bitstream but for the expression of syntax. Accordingly, the ET describes some formulas and information for the expression. This table indicates, for example, variable names, types and values of expression methods used for the expression.

The kind means the types of an expression formula. This field is described in the bitstream as 3-bit. The expression formula has 5 types as shown in the following table.

TABLE 2

| Kind | Code |
| --- | --- |
| Literal | 000 |
| Var | 001 |
| Application | 010 |
| UnaryOp | 011 |
| BinOpSeq | 100 |
| Reserved | 101~111 |

The literal kind indicates the types that the literal can have when the value of a previous field of the kind is designated as the literal only. If the flag is set to be 0, the literal kind is not described and skips the step. The literal kind has types as shown in the Table 3 below.

TABLE 3

| Literal kind | Code |
| --- | --- |
| Boolean | 000 |
| Integer | 001 |
| Real | 010 |
| String | 011 |
| Character | 100 |
| Reserved | 101~111 |

The literal value indicates the values that the literal has when the value of a previous field of the kind is designated as the literal. If the flag is set to be 0, the literal value is not described and skips the step. If the flag is set to be 1, the length of the literal value is described as 8-bit. Then, the literal value is written in alphabetic letters one by one, and each alphabetic letter can be expressed in ASCII code.

The variable name indicates the name of a variable when the value of a previous field of the kind is designated as the var. If the flag is set to be 0, the variable name is not described and skips the step. If the flag is set to be 1, the length of the variable name is described as 8-bit. Then, the variable name is written in alphabetic letters one by one, and each alphabetic letter can be expressed in ASCII code.

The operator refers to an operator if the expression formula represents an operation. If the flag is set to be 0, the operator is not described and skips the step. If the flag is set to be 1, the length of the operator is described as 8-bit. Then, the operator is written in alphabetic letters one by one, and each alphabetic letter can be expressed in ASCII code.

The child ET index is for describing a sub-expression formula if the expression formula includes another expression formula. If the flag is set to be 0, an ET index for the sub-expression formula is not described and skips the step. If the flag is set to be 1, the ET index for the sub-expression formula is described as 8-bit.

The args ET index can show the description of a factor as an ET index if the expression formula includes the factor. If the flag is set to be 0, the ET index for expressing the factor is not described and skips the step. If the flag is set to be 1, the ET index for expressing the factor is described as 8-bit.

The ET is represented in a text form as shown in the following example.

```
{
    (Kind, [Literal-Kind], [value], [name], [Op],
    [Child-Expr(ET No.)] [Args-Expr(ET No.)]),
    ...
}
```

Below is an example of the ET for the MPEG-4 SP, which supports the XML format.

```
ET
{
//0
("Literal", "Integer", "12", -, -, -, -),
("Literal", "Integer", "10", -, -, -, -),
("Literal", "Integer", "20", -, -, -, -),
("Literal", "Integer", "9", -, -, -, -),
("Literal", "Integer", "8", -, -, -, -),
//5
("Literal", "Integer", "13", -, -, -, -),
("Literal", "Integer", "2048", -, -, -, -),
("Literal", "Integer", "1024", -, -, -, -),
("Literal", "Integer", "512", -, -, -, -),
("Literal", "Integer", "31", -, -, -, -),
//10
("Literal", "Integer", "32", -, -, -, -),
("Literal", "Integer", "448", -, -, -, -),
("Literal", "Integer", "6", -, -, -, -),
("Literal", "Integer", "1", -, -, -, -),
("Literal", "Integer", "2", -, -, -, -),
//15
("Literal", "Integer", "4", -, -, -, -),
("Var", -, -, "MAXW_IN_MB", -, -, -),
("Var", -, -, "SAMPLE_COUNT_SZ", -, -, -),
("Var", -, -, "SAMPLE_SZ", -, -, -),
("Var", -, -, "MB_COORD_SZ", -, -, -),
//20
("Var", -, -, "BTYPE_SZ", -, -, -),
("Var", -, -, "NEWVOP", -, -, -),
("Var", -, -, "INTRA", -, -, -),
("Var", -, -, "INTER", -, -, -),
("Var", -, -, "QUANT_MASK", -, -, -),
//25
("Var", -, -, "ROUND_TYPE", -, -, -),
("Var", -, -, "FCODE_MASK", -, -, -),
("Var", -, -, "FCODE_SHIFT", -, -, -),
("Var", -, -, "ACPRED", -, -, -),
("Var", -, -, "ACCODED", -, -, -),
//30
("Var", -, -, "MOTION", -, -, -),
("Var", -, -, "FOURMV", -, -, -),
("Var", -, -, "MV_SZ", -, -, -),
```

```
("Literal", "Integer", "3", -, -, -, -),
*547("Var", -, -, "QUANT_SZ", -, -, -),
//35
("Var", -, -, "MAXH_IN_MB", -, -, -),
("Var", -, -, "PIX_SZ", -, -, -),
("Literal", "Integer", "...", -, -, -, -),
("Var", -, -, "FLAG_SZ", -, -, -),
("Var", -, -, "ADDR_SZ", -, -, -),
//40
("Var", -, -, "BUF_SZ", -, -, -),
("Var", -, -, "SEARCHWIN_IN_MB", -, -, -)
}
```

The type table (TT) includes fields of Type name, Entry name, Expr index and Type index.

Next, the syntax parsing tables will be described hereinafter.

The CSCIT describes details related to the element information (e.g. CSCI) as result information of a process that a parsing functional unit uses the SET and the SRT. In other words, the CSCIT has information related to all meaningful data (i.e., element information), which is processed from the typical bitstream and stored in the CSCI storing unit and to be used by the decoding functional units. The CSCI includes an index C, which is an identifier as an identification number of the pertinent element information, a flag, a name (Element Name) of pertinent element information, an attribute (e.g. a storage space size of the pertinent element information and determination of whether the pertinent element information is an array type) for designating a data-structural property of pertinent element information and global/local indicating whether the pertinent element information is used in the syntax parsing operation only or in the overall decoding operation. The CSCIT can be described by using a describing method such as a textual description or a binary description (i.e., a bit-converted binary code form). The minimum necessary data of the partical decoder description can be written in a similar scripting language.

The SET refers to a partial decoder description formed to include information related to the syntaxes of the typical bitstream. The SET includes an index of each of the syntax, an element name, a parameter and a SET-process (process by SET-PROC). Here, the index refers to an identifier (S) identifying each of the syntax used for the SRT. The element name, which is a name of the syntax, can be named with reference to the meaning or function of the syntax. The parameter is provided as a factor value when a parsing process described in the SRT calls a parsing algorithm of the SET, and this factor value can be an indentifier of a buffer space (e.g., a CSCI memory) for storing a fixed constant, a value computed from a bitstream, or data deduced from the parsing process. The factor value transferred through the parameter is distinguished by the index (P), and each factor value, which is element information (i.e., CSCI (C)), can be used when acquired data is stored. Then, in the case of needing the pertinent element information as data during the process, the pertinent element data can be read by using the parameter index (P) again. Moreover, the parameter can refer not only to the CSCI information (C) but also to a constant as indicated by the SRT. The SET-process describes the process including what processing operation is performed to generate the element information as output data after each of the bitstream syntax is inputted.

The SET can be described by using a describing method such as a textual description or a binary description (i.e., a bit-converted binary code form). The minimum necessary data of the partical decoder description can be written in a similar scripting language.

Then, the SRT refers to connection information between syntaxes in the typical bitstream. In other words, the SRT has information to order to call each of the syntax and to move to a next syntax. The parsing functional unit uses the SRT to read the typical bitstream or to determine the sequence of storing and/or renewing the element information in the CSCI storing unit.

The SRT includes an index (R), a parameter (P) and rule information.

The index (R) indexes each of the connection information (Rule). Since an index (S) of syntax designates the syntax to be processed in a particular connection index, the parsing functional unit (or the functional units performing the syntax parsing) uses the SET to perform the designated process of the pertinent syntax. The parameter is provided as a factor value when a parsing process described in the SRT calls a parsing algorithm of another SET, which is one level below the SRT in a hierarchical structure, and this factor value can be an indentifier of a buffer space (e.g., a CSCI memory) for storing a fixed constant, a value computed from a bitstream, or data deduced from the parsing process. The factor value transferred through the parameter is distinguished by the index (P), and each factor value can be used when acquired data is stored. Then, in the case of needing the pertinent element information as data during the process, the pertinent element data can be read by using the parameter index (P) again. Moreover, the parameter can refer not only to the CSCI information (C) but also to a constant as indicated by the SRT. The rule information, which describes the processing of the syntax parsing, can use control syntax, for example, a branch and a repeating statement, and can process the syntax parsing by calling an element of another SRT or SET in a lower level.

The input data indicates a list of the element information to be used for the conditional determination to control the connection of a pertinent connection index.

The number of branches, which is the number of cases capable of being connected to a following syntax, refers to the total number of the branch routes of a corresponding connection index. The branch information, which is provided in the same quantity as the number of branches (#1, #2, #3 . . . ), refers to a condition determining algorithm determining which connection index is processed next. It is possible to directly determine the sequence and contents of data to be read by the branch information. If the number of branches is 1, no input data is provided, and it directly proceeds to process the connection index designated by the branch information. However, if the number of branches is 2 or more, the condition determination (consisting of following connection information (R) after the conditional statement) is performed, and it proceeds to process a corresponding connection index The parsing functional unit renews the CSCI storing unit by processing the syntax defined in the pertinent connection index. Then, the parsing functional unit reads the renewed data by referring to the element information of the CSCI storing unit to use it for branch condition determination. For example, C0 under the branch condition of the branch information of an index R0, "C0==1," is the element information C0 after the syntax S0 is processed.

The SRT can be described by using a describing method such as a textual description or a binary description (i.e., a bit-converted binary code form). The minimum necessary data of the partical decoder description can be written in a similar scripting language.

Finally, the DVT refers to a partical decoder description in which Huffman table information to be used by each encoder/decoder is written. In each encoding, MPEG-1/2/4/AVC performs entropy coding. At this time, a Huffman coding method is mainly used. In this case, the Huffman table is used. It is required that the Huffman table information to be used by the pertinent decoder be provided in each decoding in order to realize an intergrated codec. Accordingly, the decoder description in accordance with the present invention includes the Huffman table information corresponding to each of the syntax when the syntax is parsed. Of course, in case that the Huffman table information corresponding to each standard is already written in the description storing unit, the transmission of the DVT will be omitted, or it is possible to include a codec number (Codec #) and a profile and level number (Profile and level number) only.

The DVT includes a name of each Huffman table, an actual value outputted after being compressed by a Huffman coding and a code value used when the compressed actual value is stored in the typical bitstream. For example, if the actual value, 3, is obtained by compressing an MCBPC value, the code value of 011 is written in the typical bitstream by a Huffman table mapping work (e.g., a process part of the SET). For another example, since VLD[1] is written in a process part of an index S77 of the SET, a function VLD is called. The code value is obtained by reading the typical bitstream in a length (i.e., a fixed length or a variable length) pre-determined by the function. Then, the corresponding actual value can be obtained by the Huffman table mapping work. At this time, a Huffman table [1], which is the first table CBPY, is used.

The DVT can be described by using a describing method such as a textual description or a binary description (i.e., a bit-converted binary code form). The minimum necessary data of the partical decoder description can be written in a similar scripting language.

Below is an example of the DVT described in textual description.
DVT{((0,1), (1,001), (2,010), (3,011), (4,0001), (5,000001), (6,000010), (7,000011), (8,000000001), (9,NULL)) ((0,0011), (1,00101), (2,00100), (3,1001), (4,00011), (5,0111), (6,000010), (7,1011), (8,00010), (9,000011), (10,0101), (11,1010), (12,0100), (13,1000), (14,0110), (15,11), (16,000000), (17,000001), (18,NULL)) ((0, 011), (1,11), (2,10), (3,010), (4,001), (5,0001), (6,00001), (7,000001), (8,0000001), (9,00000001), (10,000000001), (11,0000000001), (12,00000000001), (13,NULL)) ((0,11), (1,10), (2,01), (3,001), (4,0001), (5,00001), (6,000001), (7,0000001), (8,00000001), (9,000000001), (10,0000000001), (11,00000000001), (12,000000000001), (13,NULL)) . . . .

Below is another example of the DVT described in binary description.
000000111111111111111111111111111101111100001100
011001000110100001
1011001000001001100000010011000001000011000
0011010010000000010000011111
0010000110010100101001010010000100100100101001
10010001110011000001000
10010110010100010001100000110010001010010010100
01000100001001000001000
11000010110011000000000110000001000001111100011
01100010110001010000110
100001100100100000010010100001001100000010011100
0000101000000000101001
00000000101010000000000010101100000000001000011
11100010110001010000100
10001100100100000010010100001001100000010 . . . .

As described above, the decoder of the present invention can basically perform a decoding process by using an XML-based decoder description (i.e., a BSDL-based decoder description). Through the second embodiment of the present invention as described above, in the case of receiving a CDDL-based decoder description compressed in a binary form, the decoder of the present invention can perform the decoding process by converting it to an XML-based decoder description (i.e., a BSDL-based decoder description).

Since the BSDL-based decoder description (DD) has high readability, it is considered as an appropriate method for developers trying to realize various implementations based on the decoder description. However, since the XML-based BSDL format itself does not have a compression function, it can be inefficient for environments that require real-time transmission of the decoder description in terms of capacity. Accordingly, like the second embodiment of the present invention described above, the BSDL format can be expressed by using the CDDL format, which expresses the same processing operations by using less capacity, so that a compression effect necessary for the real-time transmission can be obtained.

In order to convert different types of DD, for example, CDDL and BSDL, to each other, a list of bitstream syntaxes can be utilized as an intermediate form. This is a list that is same as or similar to that of standard documents, and thus it shows breakdowns and bit lengths of various syntax information when a video bitstream is embedded in accordance with the specification. Since it is evident that all types of DD formats are written in accordance with the specification defined by standards, cross-conversion between different types of DD specifications can be performed more easily by extracting information in the form of standard documents.

Figure 18:
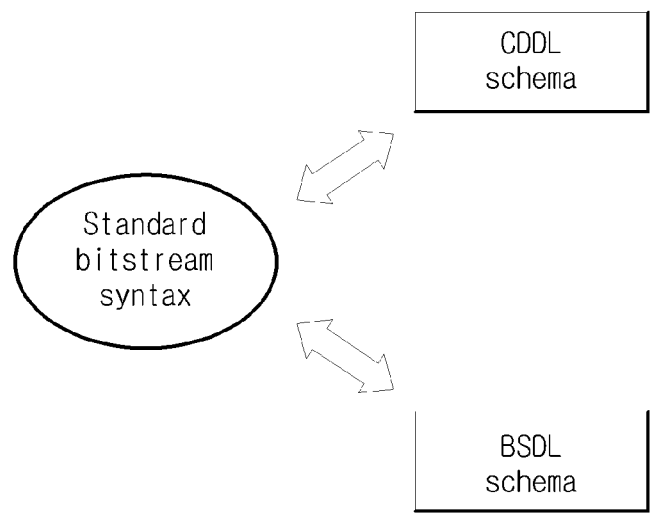
FIG. 18 is an example illustrating a cross-conversion between a CDDL and a BSDL utilizing a bitstream syntax list.

FIG. 18 is an example illustrating cross-conversion between a CDDL and a BSDL utilizing a bitstream syntax list.

In order to extract syntax information from the CDDL, simple rules, as shown below, can be applied to the CDDL-based decoder description.

1. Read syntax information of the SRT.
A. Calling a lower-level SRT element (Rn( );): define as the calling of a lower-level syntax element set in a bitstream.
B. Calling a SET element (Sn( );): determine as each individual syntax element.
C. A branch and a repeating statement: preserve the condition on the list.
2. Indentify a syntax related to the bitstream by reading the SET element.
A. READ command: determine as a syntax element having a fixed bit length. The length of bit to be read is defined by the pertinent element or by the upper-level SRT command calling the pertinent element. If a Byte-align parameter is used, the pertinent syntax is considered as a start/end code.
B, SEEK command: When be followed by IF condition in parent SRT element, it will be considered as nextbits( ) function.
C. If the branch and repeating statement are included: determine as a syntax element having a variable length.
D. If VLD (Huffman/Golomb . . . ) command is used: determine as a syntax element having a variable length.
E. If other commands than the ones described above are coupled: determine as a syntax element having a variable length.
F. If there is no bitstream reading command (for example, READ, SEEK and VLD): the pertinent SET element is not considered to be related to the configuration of the bitstream, and thus the pertinent SET element is ignored in the processing operation.

3. All of the CSCI elements are considered as spaces for storing individual syntax information that appears on the bitstream.

By applying the above rules, the CDDL syntax shown in Table 4 can be converted to an XML syntax as follows.

TABLE 4

| Element name | Mnemonic | Bits |
|---|---|---|
| do {<br>  CSCI_0 | bslbf | 32 bit |
|   CSCI_1 | uimsbf | 8 bit |
|   while (next_bits( )==00 00 01 B2) {<br>    R3( );<br>  }<br>  R1( );<br>} while (next_bits( )==433) {<br>  CSCI_2 | bslbf | 32 bit |

```
        SET
        {       ("READ P1 > P2;"),
                ("READ P1 B > P2;"),
                ("SEEK P1 > P2;"),
                ("SEEK P1 B > P2;")
        }
        SRT
        {("
        do {
                S1(32, C0);
                S0(8, C1);
                S3(32, V0);
                while(V0==434){
                        R3( );
                        S3(32, V0);
                }
                R1( );
                S3(32, V0);
        }while(V0!=433);
        S1(32, C2);
        ")}
```

Although the above description related to a decoding device and a method of analyzing a syntax for decoding a bitstream in accordance with the present invention has been described based on MPEG-4 AVC, it shall be obvious that MPEG-1, MPEG-2 and other video encoding/decoding standards can be applied without any restriction.

Also, it shall be obvious that information included in each of the decoder descriptions can be described by using not only information related to the connection of functional units for performing the decoding by one standard and information related to the processing operation required for the pertinent functional unit but also information for performing the decoding by a plurality of standards.

For example, it shall be assumed that a plurality of initial frames of encoded video data included in the extended bitstream are encoded by using MPEG-2, a plurality of following frames are encoded by using MPEG-4 and the other frames are encoded by using MPEG-1. In this case, it shall be obvious that decoder description information included in the decoder description for decoding the encoded video data will be realized such that the functional units according to each standard included in the toolbox can be organically coupled and operated, in order that each frame having different encoding methods can be decoded.

While the spirit of the invention has been described in detail with reference to certain embodiments, the embodiments are for illustrative purposes only and shall not limit the invention. It is to be appreciated that those skilled in the art can change or modify the embodiments without departing from the scope and spirit of the invention.

The invention claimed is:

1. A decoding device comprising:
a toolbox configured to store a plurality of functional units (FUs);
a reconstruction unit configured to reconstruct a decoder description by receiving a compressed decoder description;
a decoder description parsing unit configured to convert the decoder description to an XML-based decoder description;
an abstract decoding model (ADM) generating unit configured to generate an ADM by using the XML-based decoder description; and
a decoding solution configured to load the plurality of FUs stored in the toolbox by using the ADM or the XML-based decoder description to decode input data to video data,
wherein the decoder description comprises:
an FU networking table group configured to describe an FU network that is a connection relationship between FUs necessary for forming an ADM and/or a decoding solution; and
a syntax parsing table group configured to perform syntax parsing,
wherein the FU networking table group comprises:
a virtual network table (VNT);
a functional unit instance table (FUIT);
a network connection table (NCT);
a parameter table (PT);
an expression table (ET); and
a type table (TT), and
wherein the expression table (ET) including fields of Kind, Literal kind, Literal value, Variable name, Operator, Child ET index and Args ET index is used for the expression of syntax.

2. The decoding device of claim 1, wherein the compressed decoder description is a binary bitstream.

3. The decoding device of claim 1, wherein tables included in the FU networking table group comprise fields of a table start code, a table code and a table end code, the table code being for identifying the tables.

4. The decoding device of claim 1, wherein the virtual network table (VNT) describes information corresponding to a basic template.

5. The decoding device of claim 1, wherein the functional unit instance table (FUIT) stores main information for generating objects that are used as actually required networks based on a basic template, the basic template being VNT information.

6. The decoding device of claim 1, wherein the parameter table (PT) is used to generate data that is required for forming an FU, without syntax generated from a bitstream.

7. The decoding device of claim 1, wherein the network connection table (NCT) comprises information related to a port capable of functioning as a path through which data can be transmitted between FUs.

8. A decoding method comprising:
providing a toolbox configured to store a plurality of FUs, the method further comprising:
(a) reconstructing a decoder description by receiving a compressed decoder description;

(b) converting the decoder description to an XML-based decoder description;
(c) generating an abstract decoding model (ADM) by using the XML-based decoder description; and
(d) loading the plurality of FUs stored in the toolbox by using the ADM or the XML-based decoder description to decode input data to video data,
wherein the decoder description comprises:
an FU networking table group configured to describe an FU network that is a connection relationship between FUs necessary for forming an ADM and/or a decoding solution; and
a syntax parsing table group configured to perform syntax parsing,
wherein the FU networking table group comprises:
a virtual network table (VNT);
a functional unit instance table (FUIT);
a network connection table (NCT);
a parameter table (PT);
an expression table (ET); and
a type table (TT), and
wherein the expression table (ET) including fields of Kind, Literal kind, Literal value, Variable name, Operator, Child ET index and Args ET index is used for the expression of syntax.

9. The method of claim 8, wherein, in the step of (a), the compressed decoder description is a binary bitstream.

10. The method of claim 8, wherein tables included in the FU networking table group comprise fields of a table start code, a table code and a table end code, the table code being for identifying the tables.

11. The method of claim 8, wherein the virtual network table (VNT) describes information corresponding to a basic template.

12. The method of claim 8, wherein the functional unit instance table (FUIT) stores main information for generating objects that are used as actually required networks based on a basic template, the basic template being VNT information.

13. The method of claim 8, wherein the parameter table (PT) is used to generate data that is required for forming an FU, without syntax generated from a bitstream.

14. The method of claim 8, wherein the network connection table (NCT) comprises information related to a port capable of functioning as a path through which data can be transmitted between FUs.

* * * * *